(12) United States Patent
Haddock

(10) Patent No.: US 10,053,856 B2
(45) Date of Patent: Aug. 21, 2018

(54) RIB MOUNTING DEVICE WITH PIVOTING INSERT

(71) Applicant: RMH Tech LLC, Colorado Springs, CO (US)

(72) Inventor: Dustin M. M. Haddock, Colorado Springs, CO (US)

(73) Assignee: RMH Tech LLC, Colorado Springs, CO (US)

( * ) Notice: Subject to any disclaimer, the term of this patent is extended or adjusted under 35 U.S.C. 154(b) by 0 days.

(21) Appl. No.: 15/471,179

(22) Filed: Mar. 28, 2017

(65) Prior Publication Data

US 2018/0044909 A1    Feb. 15, 2018

Related U.S. Application Data

(63) Continuation of application No. 14/789,607, filed on Jul. 1, 2015, now Pat. No. 9,732,512, which is a (Continued)

(51) Int. Cl.
*E04D 1/34* (2006.01)
*E04B 1/38* (2006.01)
(Continued)

(52) U.S. Cl.
CPC .................. *E04B 1/38* (2013.01); *E04C 2/38* (2013.01); *E04D 13/14* (2013.01); *F16B 2/065* (2013.01);
(Continued)

(58) Field of Classification Search
CPC .......... E04C 2/38; F24J 2/5249; F24J 2/5258; F16B 5/0004; F16B 2/10; Y02B 10/20; Y02E 10/47; E04D 13/10; E04F 13/0821
(Continued)

(56) References Cited

U.S. PATENT DOCUMENTS 1,465,042 A    8/1923    Hruska
1,511,529 A    10/1924    Standlee
(Continued)

FOREIGN PATENT DOCUMENTS

DE    3723020 A1    1/1989
DE    202007018367 U1    7/2008
(Continued)

*Primary Examiner* — Chi Q Nguyen
(74) *Attorney, Agent, or Firm* — Marsh Fischmann & Breyfogle LLP

(57) ABSTRACT

A mounting device (100) for installation on a hollow rib of a panel is disclosed. The mounting device (100) includes a mounting body (102), an insert (160), and at least one clamping fastener (180). The mounting body (102) includes an upper section or base (104), along with a first leg (112) and a second leg (122) that each extend downwardly from the base (104) in at least generally diverging relation to one another. The first leg (112) includes a first projection (116) positionable in a recess on one sidewall of a rib, while the insert (160) includes a second projection (164) positionable in a recess on the opposite sidewall of this same rib. The clamping fastener(s) (180) extends through the second leg (122) of the mounting body (102) and forces the insert (160) in the direction of the first leg (112) of the mounting body (102).

20 Claims, 19 Drawing Sheets

Related U.S. Application Data continuation of application No. 14/257,747, filed on Apr. 21, 2014, now Pat. No. 9,085,900.

(60) Provisional application No. 61/814,426, filed on Apr. 22, 2013.

(51) Int. Cl.

| | | |
|---|---|---|
| *F24J 2/52* | (2006.01) | |
| *E04D 13/14* | (2006.01) | |
| *F16B 2/06* | (2006.01) | |
| *F16B 5/06* | (2006.01) | |
| *E04C 2/38* | (2006.01) | |
| *E04F 13/08* | (2006.01) | |
| *F16B 2/10* | (2006.01) | |
| *E04D 13/10* | (2006.01) | |
| *F16B 5/00* | (2006.01) | |

(52) U.S. Cl.
CPC ............ *F16B 5/0685* (2013.01); *F24J 2/5249* (2013.01); *F24J 2/5258* (2013.01); *E04B 2001/405* (2013.01); *E04D 13/10* (2013.01); *E04F 13/0821* (2013.01); *F16B 2/10* (2013.01); *F16B 5/0004* (2013.01); *Y02B 10/20* (2013.01); *Y02E 10/47* (2013.01)

(58) Field of Classification Search
USPC ......... 52/801.1, 26, 24, 25, 545, 173.3, 543, 52/463, 782.1; 248/237, 221.11, 231.71, 248/226.11, 228.1; 403/388, 168, DIG. 9, 403/256
See application file for complete search history.

(56) References Cited

U.S. PATENT DOCUMENTS

| | | | |
|---|---|---|---|
| 1,735,927 A | 11/1929 | Shaffer | |
| 2,183,844 A | 12/1939 | Murphy | |
| 2,340,692 A | 2/1944 | Ridd | |
| 3,039,161 A | 6/1962 | Gagnon | |
| 3,307,235 A | 3/1967 | Hennings | |
| 3,503,244 A | 3/1970 | Joslin | |
| 3,590,543 A | 7/1971 | Heirich | |
| 3,817,270 A | 6/1974 | Ehrens et al. | |
| 3,904,161 A | 9/1975 | Scott | |
| 3,986,746 A | 10/1976 | Chartier | |
| 4,200,107 A | 4/1980 | Reid | |
| 4,261,384 A | 4/1981 | Dahlbring | |
| 4,351,140 A | 9/1982 | Simpson | |
| 4,546,586 A | 10/1985 | Knudson | |
| 5,228,248 A | 7/1993 | Haddock | |
| 5,479,752 A | 1/1996 | Menegoli | |
| 5,609,326 A | 3/1997 | Stearns et al. | |
| 5,613,328 A | 3/1997 | Alley | |
| 5,715,640 A | 2/1998 | Haddock | |
| 5,732,513 A | 3/1998 | Alley | |
| 5,983,588 A | 11/1999 | Haddock | |
| 6,119,317 A | 9/2000 | Pfister | |
| 6,164,033 A | 12/2000 | Haddock | |
| 6,385,914 B2 | 5/2002 | Alley | |
| 6,688,047 B1 | 2/2004 | McNichol | |
| 6,718,718 B2 | 4/2004 | Haddock | |
| 6,725,623 B1 | 4/2004 | Riddell et al. | |
| 7,013,612 B2 | 3/2006 | Haddock | |
| 7,127,852 B1 | 10/2006 | Dressler | |
| 7,513,080 B1 | 4/2009 | Showalter | |
| 7,703,256 B2 | 4/2010 | Haddock | |
| 8,910,928 B2 | 12/2014 | Header | |
| 9,085,900 B2 * | 7/2015 | Haddock | ................... E04C 2/38 |
| 9,147,785 B2 * | 9/2015 | Haddock | ................ H02S 20/00 |
| 9,608,559 B2 * | 3/2017 | Haddock | ................ H02S 20/23 |
| 9,732,512 B2 * | 8/2017 | Haddock | ................ E04L 31/38 |
| 2002/0088196 A1 | 7/2002 | Haddock | |
| 2002/0108335 A1 | 8/2002 | Haddock | |
| 2004/0055233 A1 | 3/2004 | Showalter | |
| 2005/0217203 A1 | 10/2005 | Haddock | |
| 2012/0267490 A1 | 10/2012 | Haddock | |
| 2013/0161462 A1 | 6/2013 | Haddock | |

FOREIGN PATENT DOCUMENTS

| | | |
|---|---|---|
| DE | 102007036206 A1 | 2/2009 |
| EP | 0952272 A1 | 10/1999 |
| EP | 1126098 A1 | 8/2001 |
| JP | 05-346055 | 12/1993 |
| JP | 2004124583 A | 4/2004 |

* cited by examiner

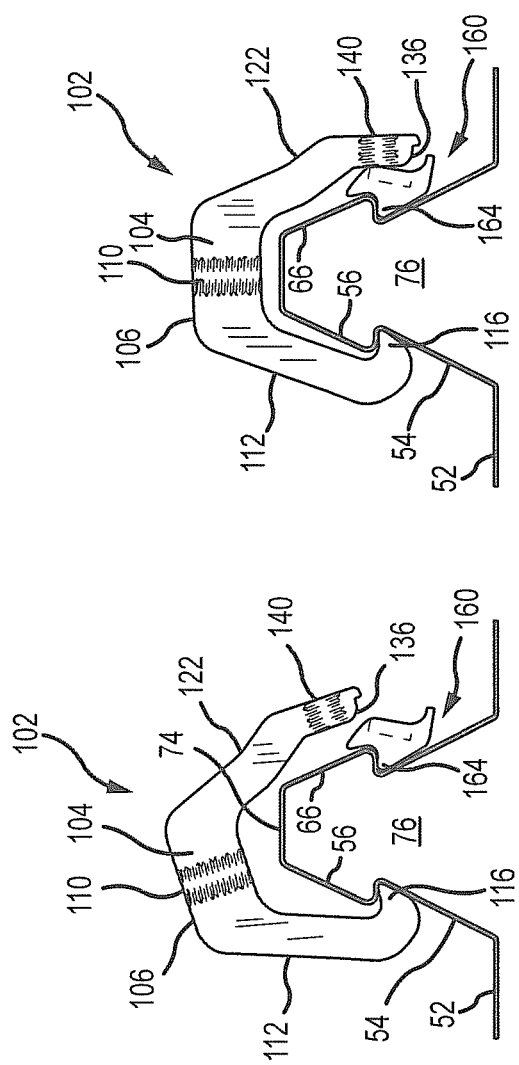

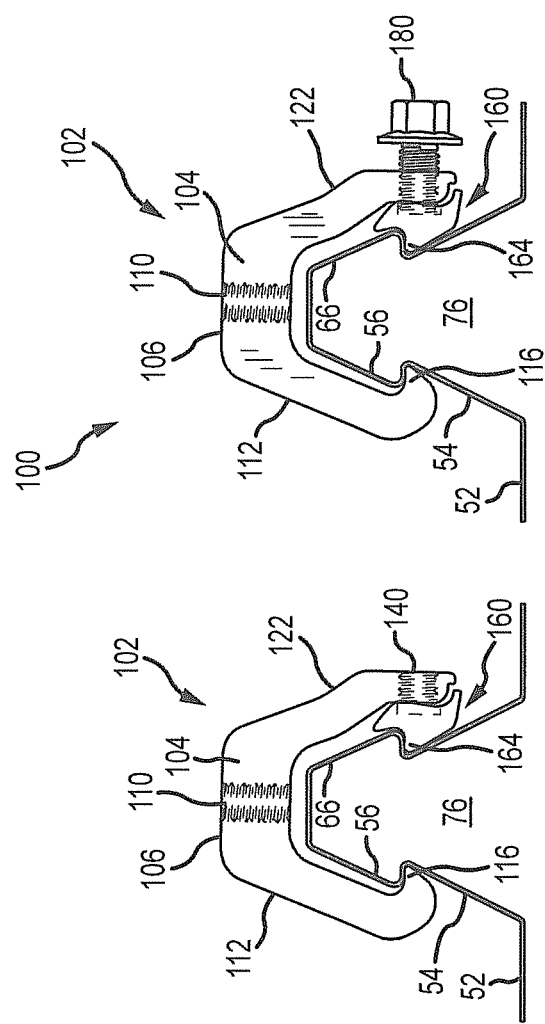

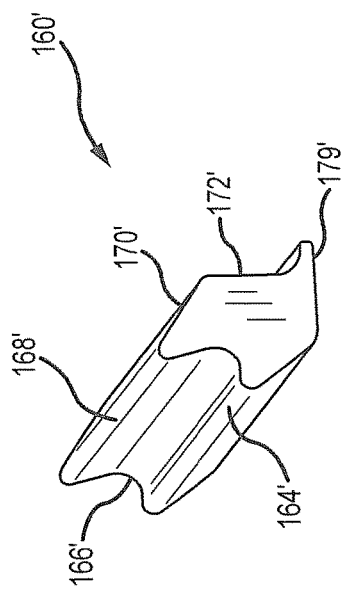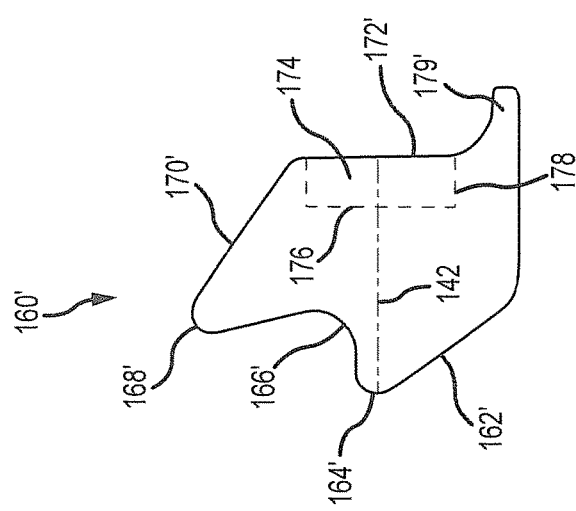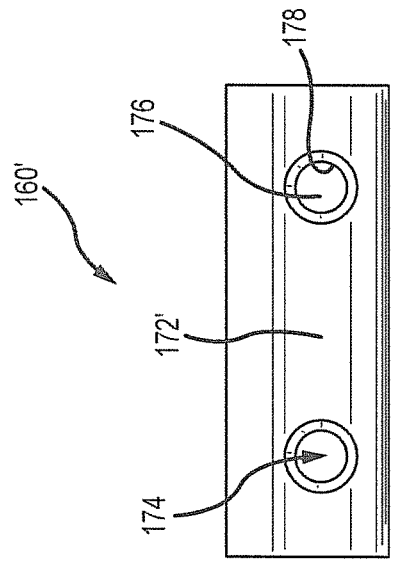

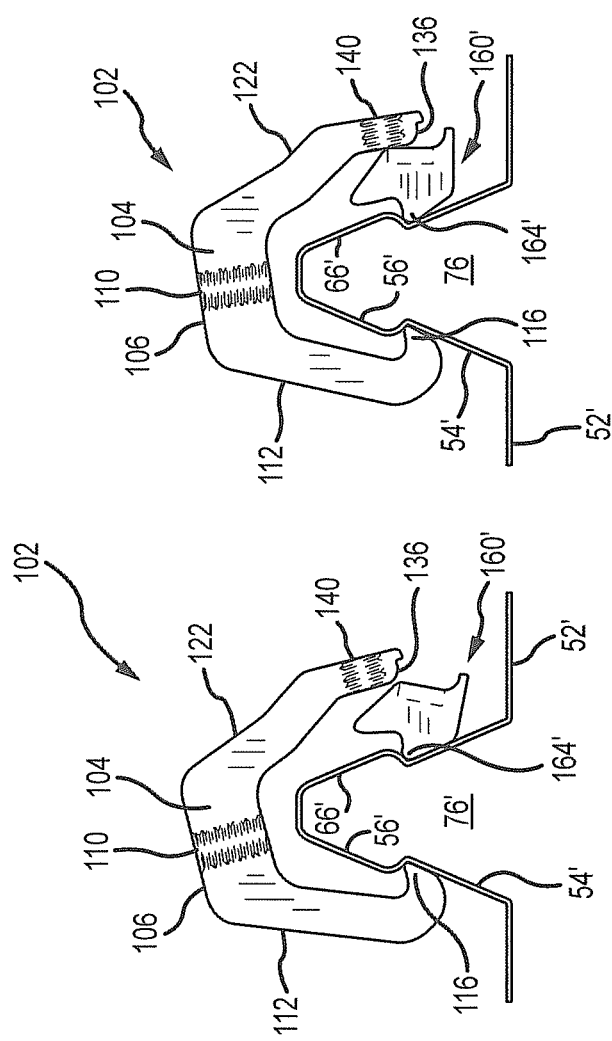

RIB MOUNTING DEVICE WITH PIVOTING INSERT

CROSS-REFERENCE TO RELATED APPLICATIONS

This patent application is a continuation of and claims priority to U.S. patent application Ser. No. 14/789,607, entitled "RIB MOUNTING DEVICE WITH PIVOTING INSERT," and that was filed on Jul. 1, 2015 (now U.S. Pat. No. 9,732,512), which is a continuation of and claims priority to U.S. patent application Ser. No. 14/257,747, entitled "RIB MOUNTING DEVICE WITH PIVOTING INSERT," and that was filed on Apr. 21, 2014 (now U.S. Pat. No. 9,085,900), which claims the benefit of U.S. Provisional Patent Application Ser. No. 61/814,426, entitled "RIB MOUNTING DEVICE WITH PIVOTING INSERT," and that was filed on Apr. 22, 2013 (now expired). The entire disclosure of each application that is set forth in this CROSS-REFERENCE TO RELATED APPLICATIONS section is hereby incorporated by reference.

FIELD

The present invention generally relates to installing structures on a building surface and, more particularly, to a multi-piece mounting device that is adapted for installation on a hollow rib of a panel.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

SUMMARY

A first aspect of the present invention is directed to a mounting device that is configured for attachment to a rib of a building surface, and includes a mounting body, at least one clamping fastener, and an insert. The mounting body includes a base, a first leg, and a second leg that collectively define a rib receptacle, and that are maintained/retained in a fixed position relative to one another. The first leg and second leg each extend from the base and are spaced from one another. The first leg includes a first projection that extends at least generally in the direction of the second leg. The clamping fastener is threadably engaged with and extends through the second leg of the mounting body. The insert is aligned with this clamping fastener and includes a second projection that extends at least generally in the direction of the first leg.

A number of feature refinements and additional features are applicable to the first aspect of the present invention. These feature refinements and additional features may be used individually or in any combination. The following discussion is applicable to the first aspect, up to the start of the discussion of a second aspect of the present invention. The mounting body may be configured such that the relative position of its base, first leg, and second leg is not adjustable. The mounting body may be of a one-piece construction (e.g., integrally formed; where there is no joint between any adjacent portions of the mounting body).

The mounting body may include at least one threaded hole for attaching any appropriate structure to the mounting body. The base may include an upper surface on a side thereof that is opposite of that which interfaces with the rib receptacle. At least one threaded attachment fastener hole may intersect this upper surface and may extend in a direction of the rib receptacle (including entirely through the base). As such, an attachment may be positioned on the base of the mounting body and secured relative to the mounting body by a threaded fastener that interfaces with the attachment and threadably engages with the mounting body. The mounting body may include a mounting flange that extends from the base, for instance to accommodate mounting any appropriate structure to the mounting body. In one embodiment, this mounting flange includes at least one un-threaded hole that extends completely through the mounting flange. As such, an attachment may be positioned on the mounting flange of the mounting body (as well as possibly the base) and secured relative to the mounting body by an appropriate fastener that interfaces with the attachment and extends at least into the mounting flange (including through the mounting flange for receipt of a threaded nut).

The first projection of the first leg extends at least generally in the direction of the second leg of the mounting body, but may also extend at least generally in a direction in which the base is spaced from the first projection (e.g., the first projection may also extend upwardly). A perimeter of this first projection may be convexly-shaped, for instance in the form of an arcuate or curved surface (e.g., the first projection may include a "rounded" end).

The first leg of the mounting body may extend both downwardly from the base and at least generally away from the second leg. The second leg of the mounting body may include a first section that extends both downwardly from the base and at least generally away from the first leg. In one embodiment, a first included angle between the base and the first leg is greater than 90°, while a second included angle between the base and the first section of the second leg is also greater than 90°. The second leg may further include a second section that extends downwardly from the noted first section and that is disposed in a different orientation than this first section. Consider the case where a reference plane extends through the rib receptacle and where this reference plane contains both the height and length dimensions of a rib when the mounting device is installed on this rib. The second section of the second leg may be disposed at least substantially parallel with this reference plane. This second section of the second leg may include at least one threaded clamping fastener hole that extends completely through the second leg. A length dimension of each such threaded clamping fastener hole may be oriented at least substantially orthogonal to the noted reference plane.

The insert may be characterized as being associated with the second leg of the mounting body. At least one clamping fastener receptacle may be formed on a side or surface of the insert that faces or projects in the direction of the second leg (e.g., an interior surface of the second leg, or a surface of the second leg that interfaces with the rib receptacle of the mounting body). Any appropriate number of clamping fastener receptacles may be utilized by the insert, for instance two or more clamping fastener receptacles may be spaced along a length dimension of the insert. Each clamping fastener receptacle may be characterized as having a closed end, an open end, and an annular sidewall that extends between its open and closed ends (e.g., in the form of a blind hole). Each clamping fastener receptacle of the insert may be un-threaded.

The second projection for the insert and each clamping fastener receptacle incorporated by the insert may be characterized as being generally oppositely disposed (e.g., disposed on opposite sides of the insert). Each clamping fastener receptacle may face or project in the direction of the second leg of the mounting body. The insert may include a flat surface that faces or projects toward the second leg of the mounting body. Each clamping fastener receptacle used by the insert may intersect this flat surface.

The second projection of the insert extends at least generally in the direction that the first leg of the mounting body is spaced from the second leg of the mounting body. The second projection of the insert may also extend at least generally in a direction in which the base is spaced from this second projection (e.g., the second projection may also extend upwardly). A perimeter of this second projection may be convexly-shaped, for instance in the form of an arcuate or curved surface (e.g., the second projection may include a "rounded" end).

A perimeter of the insert may include a first flat surface (e.g., a rib alignment surface), the noted second projection, a concave pocket, a third projection, a second surface, and a third flat surface. In this embodiment: 1) the second projection is located between the first flat surface and the concave pocket; 2) the concave pocket is located between the second and third projections; 3) the third projection is located between the concave pocket and the second surface; and 4) the third flat surface is at least generally oppositely disposed from the second projection. The first flat surface of the insert may be positioned against a rib sidewall of a rib and the second projection of the insert may be positioned in a recess of this same rib sidewall when initiating installation of the mounting device on this rib. The first flat surface and the second surface of the insert may be disposed in at least generally the same orientation (e.g., having the same "sign" of slope, where the "sign" of the slope is either positive or negative), but in one embodiment are not disposed in parallel relation to one another (e.g., although having the same sign of slope, the magnitude of the slope may be different for the first flat surface and the second surface). The third flat surface on the perimeter of the insert may include one or more of the above-noted clamping fastener receptacles.

A building system includes a panel assembly (e.g., a plurality of interconnected panels) and the above-described mounting device, where the mounting device is installed on a first rib of the panel assembly. In this regard, the first rib is received within the rib receptacle of the mounting body. The first projection on the first leg of the mounting body is positioned within a first recess on a first sidewall of this first rib. The second projection on the insert is positioned within a second recess on a second sidewall of the first rib (where the first and second sidewalls of the first rib are spaced from one another). The first and second recesses on the sidewalls of the first rib may be disposed at least generally opposite of one another. At least one clamping fastener forces the insert against the second sidewall of the first rib such that the insert is spaced from the second leg of the mounting body when the mounting device is installed on this first rib.

Any appropriate attachment may be installed on the mounting body. One option is to position an attachment on the base of the mounting body, and to direct one or more attachment mounting fasteners through the attachment and into threaded engagement with the base of the mounting body. Another option is to position the attachment on a flange of the above-noted type (as well as possibly on the base), and to direct one or more attachment mounting fasteners through the attachment and at least into the mounting flange.

A second aspect of the present invention is directed to a method of installing a mounting device on a rib of a building surface. A first projection of a mounting body for this mounting device is positioned within a first recess on a first sidewall of a first rib. A second projection of an insert for this mounting device is positioned within a second recess on a second sidewall of this same first rib. The mounting body is moved at least generally about the first projection and relative to the first rib. This movement brings the mounting body into contact with the insert. The insert is moved at least generally about the second projection and relative to the first rib. At least one threaded fastener is directed through the mounting body and into engagement with the insert to force the insert against the second sidewall of the first rib.

A number of feature refinements and additional features are applicable to the second aspect of the present invention. These feature refinements and additional features may be used individually or in any combination. The following discussion is applicable to the second aspect, up to the start of the discussion of a third aspect of the present invention. The positioning of the projections (mounting body and insert) into the recess on the corresponding sidewall of the first rib may be executed at any appropriate time, including sequentially (in any order) or simultaneously. In one embodiment, the first and second recesses on the first and second sidewalls, respectively, of the first rib are oppositely disposed or disposed in opposing relation (e.g., at least generally at the same elevation relative to a pitch of the building surface).

The movement of the mounting body about its first projection and relative to the first rib may be characterized as pivoting the mounting body at least generally about the first projection and relative to the first rib (within the first recess). The movement of the insert about its second projection and relative to the first rib may be characterized as pivoting the insert at least generally about the second projection and relative to the first rib (within the second recess). The movement of the mounting body and insert relative to the first rib in the noted manner may be characterized as being in at least generally opposite directions from a common vantage or viewing location. The movement of the mounting body relative to the first rib may be characterized as clockwise motion from a first view, while the movement of the insert relative to the first rib may be characterized as a counterclockwise motion from this same first view. The movement of the mounting body relative to the first rib may be characterized as counterclockwise motion from a second view, while the movement of the insert relative to the first rib may be characterized as a clockwise motion from this same second view.

At least part of the noted movement of the insert may be characterized as being responsive to the movement of the mounting body in the noted manner while the mounting body is in contact with the insert—movement of the mounting body and while in contact with the insert may cause movement of the insert relative to the first rib, for instance by a camming action. The mounting body may be characterized as a cam and the insert may be characterized as a cam follower (e.g., the insert may "cam off" of the mounting body during movement of the mounting body relative to the first rib).

At least part of the noted movement of the insert relative to the first rib may be responsive to at least one threaded fastener (e.g., a clamping fastener) engaging the insert to force the insert against the second sidewall of the first rib. In one embodiment, a first portion of the noted movement of the insert is responsive to the noted movement of the mounting body (and contact between the mounting body and insert), while a subsequent portion of the noted movement of the insert is responsive to engagement of a least one threaded fastener with the insert. Each such threaded fastener is theadably engaged with the mounting body, but is not theadably engaged with the insert in one embodiment.

One characterization of the noted movement of the mounting body relative to the first rib is that this captures at least an upper section of the first rib within the mounting body. Another characterization of the noted movement of the mounting body relative to the first rib is that this captures the insert between the mounting body and the second sidewall of the first rib. Yet another characterization of the noted movement of the mounting body relative to the first rib is that this presses the insert between the second sidewall of the first rib and the mounting body prior to engaging the insert with at least one threaded fastener.

The insert may be engaged with both the mounting body and the second sidewall of the first rib after movement of the mounting body relative to the first rib has been terminated. Engagement of at least one threaded fastener with the insert may compress the first rib (e.g., reduce the spacing between the first and second sidewalls of the first rib), may dispose the insert in spaced relation to the mounting body, or both.

The mounting body may include a base, a first leg that extends from the base and that comprises the first projection, and a second leg that extends from the base so as to be spaced from the first leg. The second leg of the mounting body may be brought into contact with the insert during the noted movement of the mounting body. In one embodiment, a rounded end portion of the second leg of the mounting body contacts an inclined surface of the insert when moving the mounting body into position on the first rib in the noted manner.

A third aspect of the present invention is directed to a building system that includes a panel assembly, a mounting body, an insert, and at least one clamping fastener. The panel assembly includes a first hollow rib having an upper end, a first sidewall, and a second sidewall. The first and second sidewalls of the first rib extend from opposite sides of the upper end in at least generally divergent relation to one another (e.g., a trapezoidal configuration).

The mounting body for the third aspect includes a base, along with first and second legs that are spaced from each other and that extend downwardly from the base. At least an upper section of the first hollow rib is received within a rib receptacle of the mounting body that is collectively defined by the base, first leg, and second leg. The first leg includes a first projection that extends at least generally in a direction of the second leg and that is disposed within a first recess on the first sidewall of the first hollow rib. The position of each of the first leg, base, and second leg of the mounting body relative to each other remains fixed (e.g., the mounting body itself is of a static or non-adjustable configuration).

The insert for the third aspect is disposed between the second leg of the mounting body and the second sidewall of the first hollow rib. The insert includes a second projection that extends at least generally in a direction of the first leg of the mounting body and is disposed in a second recess on the second sidewall of the first hollow rib. At least one clamping fastener is threadably engaged with and extends through the second leg of the mounting body and into engagement with the insert to dispose the insert in spaced relation to the second leg of the mounting body.

A fourth aspect of the present invention is directed to a mounting device that may be attached to a rib of a building surface. This mounting device includes a mounting body, at least to one clamping fastener, and an insert. The mounting body includes a base, along with first and second legs that are spaced from each other. At least an upper section of a rib is received within a rib receptacle of the mounting body that is collectively defined by the base, first leg, and second leg. A reference plane extends through the rib receptacle in an orientation that includes a height and length dimension of a rib when the mounting device is in the installed position. The first leg extends both downwardly from the base and away from the reference plane, and includes a first projection that extends back in a direction of this reference plane. The second leg includes a first section that extends both downwardly from the base and away from this reference plane, along with a second section that extends downwardly from the first section in a different orientation than the first section. The position of each of the first leg, base, and second leg of the mounting body relative to each other remains fixed (e.g., the mounting body itself is of a static or non-adjustable configuration).

At least one clamping fastener is threadably engaged with and extends through the second leg of the mounting body. The insert for the fourth aspect is disposed within the rib receptacle of the mounting body in alignment with at least one clamping fastener. This insert includes a fastener receptacle surface, a second projection, and a rib alignment surface. The fastener receptacle surface projects toward the second section of the second leg of the mounting body, and includes at least one clamping fastener receptacle in the form of a blind hole. The second projection of the insert extends in a direction of the above-noted reference plane, and is at least generally oppositely disposed from the fastener receptacle surface. The rib alignment surface for the insert extends both upwardly and toward the reference plane in proceeding to the second projection.

A number of feature refinements and additional features are separately applicable to each of above-noted aspects of the present invention. These feature refinements and additional features may be used individually or in any combination in relation to each of the above-noted aspects of the present invention. Initially and unless otherwise noted to the contrary, any feature of the mounting body and/or insert that is discussed in any one of the aspects of the present invention may be utilized by each of the other aspects of the present invention.

The mounting device that is described herein may be installed on a hollow rib of a panel assembly that defines a building surface, such as a roofing surface. Multiple panels may be appropriately interconnected to define the panel assembly for such a building surface. Each panel may include at least one hollow rib (having a hollow interior). Edge portions of adjacent panels may be interconnected/nested to define such a hollow rib. In one embodiment, a hollow rib on which the mounting device is installed includes an upper end or crown (e.g., a flat surface), along with first and second sidewalls that are spaced from one another. One embodiment has the mounting device being installed on a trapezoidal rib (e.g., where an included angle between the upper end and each of the first and second sidewalls is greater than 90°).

A continuous open space may be collectively defined by the noted upper end and the first and second sidewalls. In one embodiment, the adjacentmost portions of the first and second sidewalls on the interior of the hollow rib are separated by an open space of at least about ½ inch. Installation of the mounting device on the hollow rib may compress the hollow rib to a degree. However and in one embodiment, the hollow rib is not collapsed by having a mounting device installed thereon in the manner described herein.

Any references herein to "above," "upwardly", "below," "downwardly" or the like are in relation to the mounting device being in an upright position (e.g., the position of the mounting device when installed on a rib). References herein to a "vertical" dimension is that which coincides with an upright position or orientation for the mounting device. In a roofing application, the pitch of the roof may define the baseline for what is "upright" for purposes of the mounting bracket. For instance, the noted vertical dimension may be characterized as being the dimension that is orthogonal to the pitch of the roof in this case (e.g., the base of the mounting body may be disposed above an upper end wall of a rib on which the mounting body is positioned, again where "above" is measured in the noted vertical dimension (e.g., orthogonal to the pitch of the roof in this case)).

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a mounting flange includes "a mounting hole" alone does not mean that the mounting flange includes only a single mounting hole). Moreover, any failure to use phrases such as "at least one" also does not limit the corresponding feature to the singular (e.g., indicating that a mounting flange includes "a mounting hole" alone does not mean that the mounting flange includes only a single mounting hole). Use of the phrase "at least generally" or the like in relation to a particular feature encompasses the corresponding characteristic and insubstantial variations thereof (e.g., indicating that a surface is at least substantially flat encompasses the surface actually being flat). Finally, a reference of a feature in conjunction with the phrase "in one embodiment" does not limit the use of the feature to a single embodiment.

BRIEF DESCRIPTION OF THE FIGURES

FIGS. 10A-F are end views that illustrate a representative sequence for installing the mounting device on the rib for the building/roofing system of FIG. 2.

FIG. 15A is a perspective view of the insert used by the mounting device of FIG. 14.

FIG. 15B is an end view of the insert of FIG. 15A.

FIG. 15C is a side view of the insert of FIG. 15A.

FIGS. 16A-D are end views that illustrate a sequence for installing the mounting device of FIG. 14 on the rib profile of FIG. 13.

DETAILED DESCRIPTION

Figure 1:
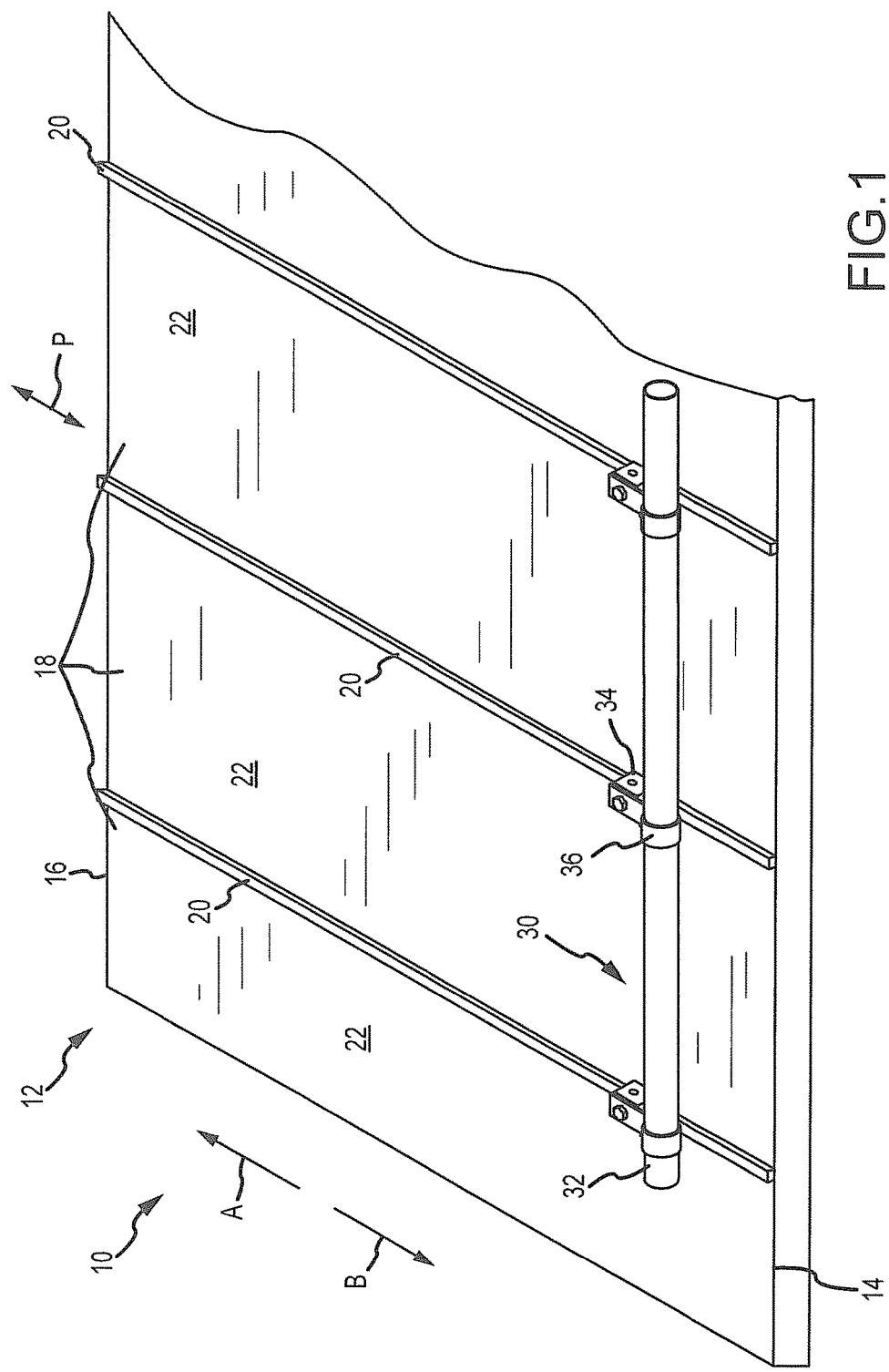
FIG. 1 is a perspective view of one type of an attachment (in the form of a cross member assembly for snow retention) installed on a building/roofing surface.

FIG. 1 presents one embodiment of what may be referred to as a building or roofing system 10 (hereafter "roofing system 10"). The system 10 includes a cross member assembly 30 that is installed on a building/roofing surface 12 (e.g., to provide a snow retention function). Only a portion of the building surface 12 is illustrated in FIG. 1. The building surface 12 may be of any appropriate type (e.g., a siding or roofing surface of a building) and may be defined in any appropriate manner (e.g., by a plurality of interconnected metal panels). In the illustrated embodiment, the building surface 12 is in the form of a roofing surface 12. In this regard, the roofing surface 12 has a pitch P (a slope or incline, the direction or orientation of which is indicated by the double-headed arrow in FIG. 1). As used herein, the arrow A identifies the direction of increasing slope (e.g., the "uphill" direction, the direction of increasing elevation along the roofing surface 12, or the up-slope direction). Conversely, the arrow B identifies the direction of decreasing slope (e.g., the "downhill" direction, the direction of decreasing elevation along the roofing surface 12, or the down-slope direction).

Generally, the roofing surface 12 may be defined in any appropriate manner and may be of any appropriate configuration. For instance, the roofing surface 12 may include one or more roofing sections, each of which may be of any appropriate pitch/slope and/or shape. The cross member assembly 30 may be installed at any appropriate location on the roofing surface 12 and in any appropriate manner, and furthermore the cross member assembly 30 may be of any appropriate length. Multiple cross member assemblies 30 may be used and disposed in any appropriate arrangement.

The roofing surface 12 illustrated in FIG. 1 is but one representative configuration that may be utilized by the roofing system 10. The roofing surface 12 may be of any pitch, but at least generally slopes downwardly in a direction denoted by arrow B in FIG. 1 from a peak 16 of the roofing surface 12 to an edge 14 of the roofing surface 12. Multiple panels 18 (e.g., metal panels) collectively define the roofing surface 12. The interconnection of each adjacent pair of panels 18 in the illustrated embodiment defines what may be characterized as a "panel joint." In the illustrated embodiment, the panel joint is in the form of a standing seam 20 (only schematically illustrated in FIG. 1).

The standing seams 20 may at least generally proceed in the direction of or along the slope or pitch P of the roofing surface 12 (e.g., the pitch of the length dimension of the standing seams 20 may match the pitch P of the corresponding portion of the roofing surface 12). Each panel 18 includes at least one base section 22 that is at least generally flat or planar and that is disposed between each adjacent pair of standing seams 20 on the roofing surface 12. Each panel 18 could include one or more crests, minor ribs, intermediate ribs, striations, fluting, or flutes between its corresponding pair of standing seams 20 so as to provide multiple base sections 22 on each panel 18 (not shown).

The panels 18 may be of any appropriate configuration so to allow them to be interconnected or nested in a manner that defines a standing seam 20, and the standing seams 20 may be disposed in any appropriate orientation relative to the base sections 22 of the panels 18 that define the standing seams 20. Generally, the standing seams 20 may be characterized as at least initially extending orthogonally (e.g., perpendicularly) relative to the base sections 22 of the corresponding panels 18. The illustrated standing seams 20 may be characterized as having a vertical end section, or as being of a vertical standing seam configuration. However, the end sections of the various standing seams 20 could also have portions that are horizontally disposed (e.g., at least generally parallel with the base sections 22 of the corresponding panels 18), or as being of a horizontal standing seam configuration.

The cross member assembly 30 is installed on the roofing surface 12. The cross member assembly 30 generally includes at least one mounting device 34, an adapter 36 for each mounting device 34, and a cross member 32 that extends through at least one adapter 36. That is, each adapter 36 is configured to receive at least a portion of the cross member 32. While the cross member 32 may provide the function of a snow retention device, or a structure that at least attempts to impede or retard the movement of snow and/or ice down the inclined roofing surface 12, the cross member 32 may provide any appropriate function or combination of functions. In any case, the adapter 36 and cross member 32 may be collectively referred to as an "attachment" that is interconnected with the roofing surface 12 by multiple mounting devices 34 in the illustrated embodiment. The mounting devices 34 may be used to install any appropriate type of attachment on the roofing surface 12.

Figure 2:
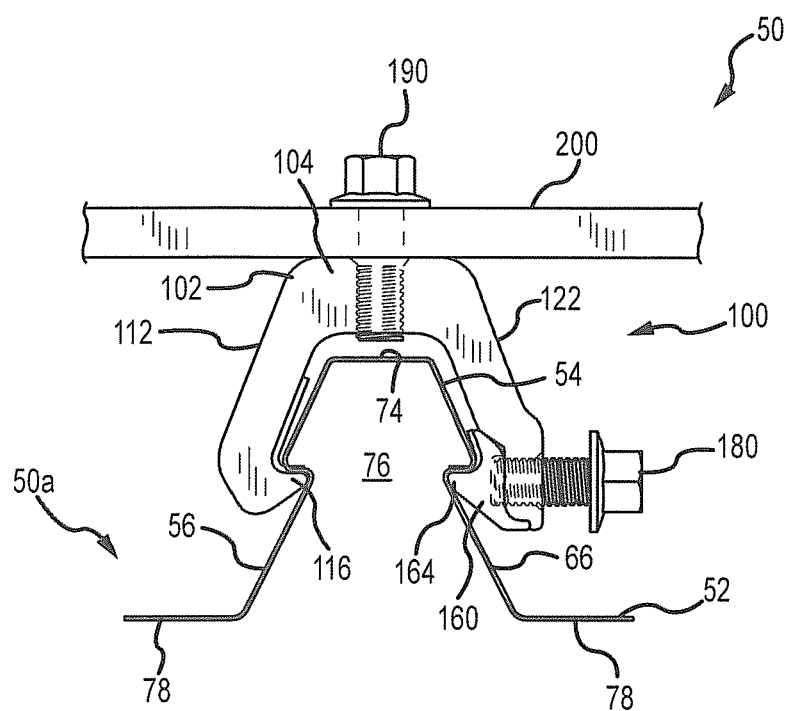
FIG. 2 is an end view of a building/roofing system that uses one embodiment of a mounting device, having a separate mounting body and insert, to interconnect an attachment to a rib of a building/roofing surface.

Another embodiment of a building/roofing system is illustrated in FIG. 2 and is identified by reference numeral 50. The building/roofing system 50 includes at least one mounting device 100 and a building/roofing surface 50a. The building/roofing surface 50a may be defined by a plurality of panels 52 that are interconnected in any appropriate manner (e.g., one edge portion of one panel 52 may be "nested" or disposed in overlapping relation with an edge portion of another panel 52), with each panel 52 having at least one hollow rib 54. A hollow rib 54 may be defined by the interconnection of adjacent panels 52 of the panel assembly as well. Typically the building/roofing system 50 will utilize a plurality of mounting devices 100 to mount an attachment 200 of any appropriate type/configuration (e.g., a frame for equipment of any type; a walkway) to the building/roofing surface 50a. The discussion presented above with regard to the building/roofing surface 12 is equally applicable to the building/roofing surface 50a. Generally, the attachment 200 is positioned directly on a mounting body 102 of the mounting device 100, and is secured thereto by one or more attachment fasteners 190 (e.g., a threaded member, such as a bolt having a threaded shaft and head).

Figure 3:
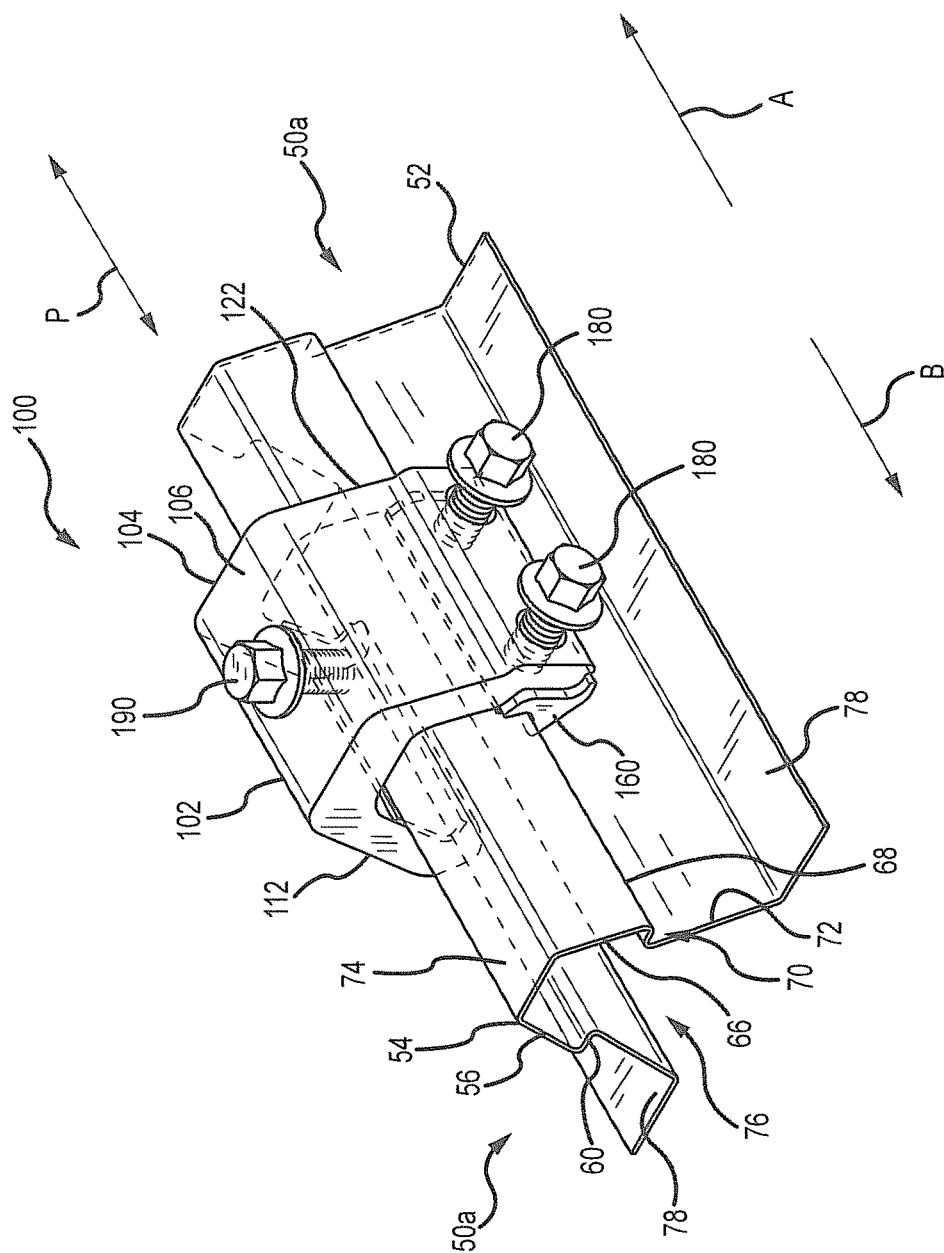
FIG. 3 is a perspective view of the mounting device and associated rib from the building/roofing system of FIG. 2.

FIG. 3 is a perspective view of the mounting device 100 and rib 54 from the building/roofing system 50 of FIG. 2. The length dimension of the various ribs 54 of the building/roofing surface 50a (coinciding with the length dimension of the corresponding panels 52) will typically be installed such that the length dimension of the ribs 54 will coincide with or define the pitch P when used as a roofing surface and as discussed above. Again, the arrow A identifies the direction of increasing slope for the roofing surface 50a (e.g., the "uphill" direction, the direction of increasing elevation along the roofing surface 50a, or the up-slope direction), while the arrow B identifies the direction of decreasing slope for the roofing surface 50a (e.g., the "downhill" direction, the direction of decreasing elevation along the roofing surface 50a, or the down-slope direction).

Figure 4:
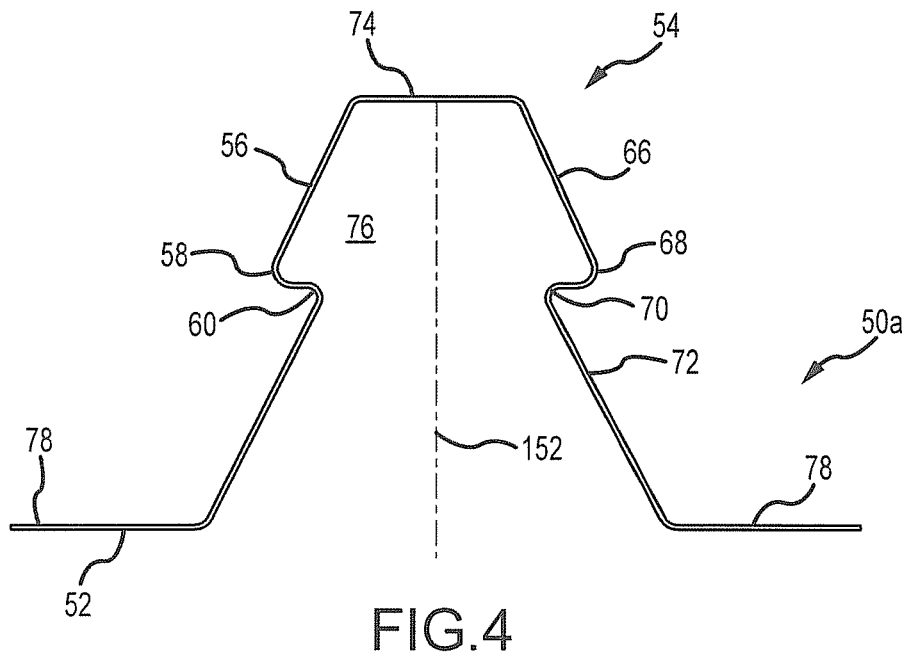
FIG. 4 is an enlarged end view of the rib from the building/roofing surface in FIG. 2.

FIG. 4 presents an enlarged end view of a rib 54 from the building/roofing surface 50a shown in FIGS. 2-3. The rib 54 (on which the mounting device 100 is installed) may be formed in the panel 52 in any appropriate manner. As noted, a rib 54 may be defined by interconnected panels 52. In any case, the panel 52 may be of any appropriate configuration and may be formed from any appropriate material or combination of materials (e.g., metal; metal alloy). Each panel 52 may include one or more ribs 54 and one or more base sections 78. The entirety of each base section 78 may be flat or planar. However, one or more small structures may be formed/shaped into one of more base sections 78 of a given panel 52, for instance one or more crests, minor ribs, intermediate ribs, pencil ribs, striations, fluting, flutes, or the like.

The rib 54 includes a first sidewall 56, a second sidewall 66, and an upper end or crown 74 that collectively define a hollow interior 76 for the rib 54. The hollow interior 76 may be in the form of a continuous open space. In one embodiment, the adjacentmost portions of the first sidewall 56 and second sidewall 66 (measured on the interior 76 of the hollow rib 54) are separated by an open space of at least about ½ inch. Generally, the first sidewall 56 and the second sidewall 66 are spaced from each other, and at least generally converge toward one another progressing from the adjacent base section 78 of the panel 52 to the upper end 74 of the rib 54 (the first and second sidewalls 56, 66 diverge relative to one another proceeding away from the upper end 74). The first sidewall 56 and the second sidewall 66 may be the mirror image of one another. In the illustrated embodiment, the upper end 74 of the rib 54 is a flat surface that is parallel to the pitch P of the roofing surface 50a or to a plane that defines the inclination of the roofing surface 50a.

The first sidewall 56 of the rib 54 may be characterized as including a projection 58. A recess 60 (e.g., a curved or arcuate surface that extends along the length of the rib 54) is disposed directly below the projection 58. Similarly, the second sidewall 66 of the rib 54 may be characterized as including a projection 68. A recess 70 (e.g., a curved or arcuate surface that extends along the length of the rib 54) is disposed directly below the projection 68. In one embodiment, the distance between the recesses 60, 70 is at least about ½ inch (measured within the interior 76). In any case, a transition section 72 of the second sidewall 66 extends from the recess 70 at least toward the corresponding base section 78 of the panel 52. In the illustrated embodiment, the transition section 72 is a flat surface that extends all the way from the recess 70 to the corresponding base section 78.

Additional views of the mounting device 100 are presented in FIGS. 5, 6, 7A, and 7B. The mounting device 100 may be installed on the rib 54, as well as on other hollow rib profiles. The mounting device 100 generally includes a mounting body 102 and a separate insert 160. The mounting body 102 may be formed from any appropriate material or combination of materials (e.g., a metal; a metal alloy), and may be formed in any appropriate manner (e.g., extrusion). In one embodiment, the mounting body 102 is of a one-piece or integral construction (e.g., lacking any joint or joints between adjacent components or portions of the mounting body 102).

The mounting body 102 for the mounting device 100 includes a base 104, a first leg 112, and a second leg 122 that collectively define a rib receptacle 150. The base 104, first leg 112, and second leg 122 are retained in a fixed position relative to one another. A reference plane 152 extends through this rib receptacle 150, and is oriented to contain both the height dimension and the length dimension of the rib 54 when the mounting device 100 is installed on the rib 54 (e.g., the reference plane 152 may be characterized as extending along the pitch P of the roofing surface 50a and perpendicularly to a reference plane that contains the base section(s) 78 of the panels 52 (or oriented perpendicularly to the pitch P)). A reference plane 154 may be positioned above the mounting device 100 and is perpendicular to the reference plane 152.

The base 104 of the mounting body 102 may be characterized as being disposed in overlying relation to the upper end 74 of the rib 54 when the mounting device 100 is installed on the rib 54. As shown in FIG. 2, the base 104 may actually be spaced from the upper end 74 of the rib 54 in the installed configuration. In any case, the base 104 may be characterized as having an upper section 106 and an oppositely disposed lower section 108. A threaded hole 110 is accessible via the upper section 106 of the base 104 (e.g., the threaded hole 110 may extend to the upper section 106, although a countersink could extend from the upper section 106 to the threaded hole 110). In the illustrated embodiment, the threaded hole 110 extends completely through the base 104 (i.e., the threaded hole 110 may extend from the upper section 106 to the lower section 108 of the base 104). More than one threaded hole 110 could be provided for the base 104. Generally, the threaded hole 110 is used to secure the attachment 200 to the mounting device 100 (e.g., FIG. 2; more specifically to clamp the attachment 200 against the upper section 106 of the base 104 using one or more threaded attachment fasteners 190). In the illustrated embodiment, the length dimension of each threaded hole 110 is contained within or is parallel to the reference plane 152.

The first leg 112 of the mounting body 102 may be characterized as extending from one side of the base 104, while the second leg 122 of the mounting body 102 may be characterized as extending from an opposite side of the base 104. In any case, the first leg 112 is disposed alongside at least an upper portion of the first sidewall 56 of the rib 54 when the mounting device 100 is installed on the rib 54. An included angle between the first leg 122 and the lower section 108 of the base 104 (measured within the rib receptacle 150) may be greater than 90° or in the form of an obtuse angle.

The first leg 112 of the mounting body 102 includes a free end 114 having a projection 116 (e.g., the first leg 112 may be characterized as a cantilever—being supported on only one end thereof (at the base 104)). The projection 116 may be defined by an arcuate or curved surface, and defines a pocket 118 on the inside surface of the first leg 112. A pad 120 having a higher coefficient of friction than the mounting body 102 may be positioned along the pocket 118, and may extend along the inside surface of the first leg 112 in the direction of the base 104 (e.g., FIGS. 9A and 9B).

The projection 116 for the first leg 112 may be characterized as extending at least generally in the direction in which the second leg 122 of the mounting body 102 is spaced from the first leg 112 of the mounting body 102 (or toward the reference plane 152), as extending at least generally in the direction in which the base 104 is spaced from the free end 114 of the first leg 112 (or toward the reference plane 154), or both. The projection 116 may be characterized as "pointing" both at least generally upwardly (or toward the reference plane 154) and toward the noted reference plane 152 when the mounting device 100 in installed on a rib 54 of the building/roofing surface 50a. In any case, the projection 116 is disposed within the recess 60 on the first sidewall 56 of the rib 54 (and directly below the projection 58 on the first sidewall 56 of the rib 54) when the mounting device 100 in installed on the rib 54 of the building/roofing surface 50a. Contact between the first leg 112 of the mounting body 102 and the rib 54 of the building/roofing surface 50a may be limited to the projection 116/pocket 118 and the recess 60/projection 58 (e.g., the remainder of the first leg 112 the mounting body 102 may be maintained in spaced relation to the rib 54).

The second leg 122 of the mounting body 102 is disposed alongside at least an upper portion of the second sidewall 66 of the rib 54 when the mounting device 100 is installed on the rib 54. A first section 124 of the second leg 122 extends from the base 104 in one orientation, while a second section 126 of the second leg 122 extends from the first section 124 in a different orientation. An included angle between the first section 124 of the second leg 122 and the lower section 108 of the base 104 (measured within the rib receptacle 150) may be greater than 90° or in the form of an obtuse angle. The second section 126 of the second leg 122 may be characterized as being disposed at least generally parallel with the reference plane 152.

The second leg 122 of the mounting body 102 is actually spaced from the second sidewall 66 of the rib 54 when the mounting device 100 is fully installed on the rib 54—no portion of the second leg 122 of the mounting body 102 contacts the second sidewall 66 of the rib 54 at this time. Instead, the insert 160 is used to contact the second sidewall 66 of the rib 54. The second leg 122 the mounting body 102 includes a number of features to accommodate the insert 160. One is that the inside or interior surface of the second leg 122 (that projects toward/interfaces with the rib receptacle 150) may be characterized as including an insert receptacle 128. An upper surface 130 and a side surface 132 collectively define this insert receptacle 128. Generally, the insert 160 may be positioned against the side surface 132 of the second leg 122 that collectively defines the insert receptacle 128 with the upper surface 130 (the insert 160 could also be positioned against the upper surface 130 (FIG. 9A), but is spaced therefrom in the FIG. 5 configuration), and a lip 179 of the insert 160 may be positioned within a recess 138 formed on a free end 134 of the second leg 122, all when the mounting body 102 and insert 160 have been positioned on the rib 54, but prior to activation of the clamping fasteners 180 (e.g., the FIG. 5 configuration). The installation of the mounting device 100 on the rib 54 will be discussed in more detail below in relation to FIGS. 10A-10F.

The second leg 122 of the mounting body 102 may be characterized as a cantilever in that it is supported on only one end thereof—at its intersection with the base 104 (i.e., the second leg 122 includes the noted free end 134, which is spaced from the base 104). A rounded portion 136 is included on the free end 134 of the second leg 122. This rounded portion 136 defines at least part of the boundary for the recess 138 (which may receive the lip 179 of the insert 160). Moreover, this rounded portion 136 may be used to reposition the insert 160 during installation of the mounting device 100 on the rib 54 (again, as will be discussed below in relation to FIGS. 10A-10F).

A pair of threaded holes 140 extend completely through the second section 126 of the second leg 122 of the mounting body 102. The length dimension of each threaded hole 140 is identified by reference numeral 142, and is oriented orthogonally to the reference plane 152 in the illustrated embodiment. Each threaded hole 140 for the second leg 122 receives a single clamping fastener 180. Any appropriate number of threaded holes 140 may be incorporated by the second section 126 of the second leg 122 (including more than two threaded holes 140). Generally, one or more clamping fasteners 180 are directed through the second section 126 of the second leg 122, engage the insert 160, and move the insert 160 away from the second leg 122 when installing the mounting device 100 on a rib 54. As the insert 160 is engaged with the second sidewall 66 of the rib 54, this motion of the insert 160 may compress the rib 54 to a degree (in a lateral dimension coinciding with the dimension in which the first sidewall 56 of the rib 54 is spaced from its corresponding second sidewall 66).

Figure 5:
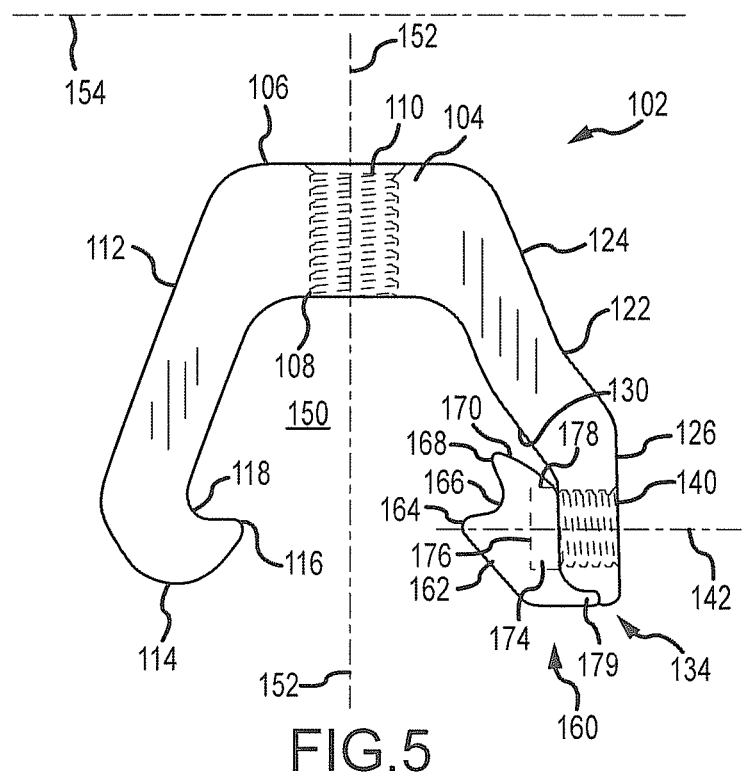
FIG. 5 is an enlarged end view of the mounting body and insert used by the mounting device in FIG. 2.
Figure 6:
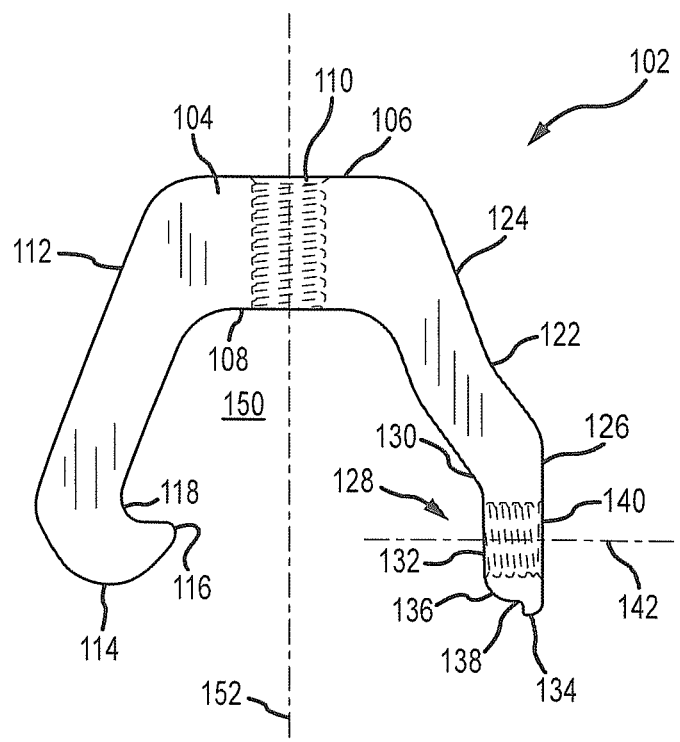
FIG. 6 is an enlarged end view of the mounting body used by the mounting device in FIG. 2.
Figure 7B:
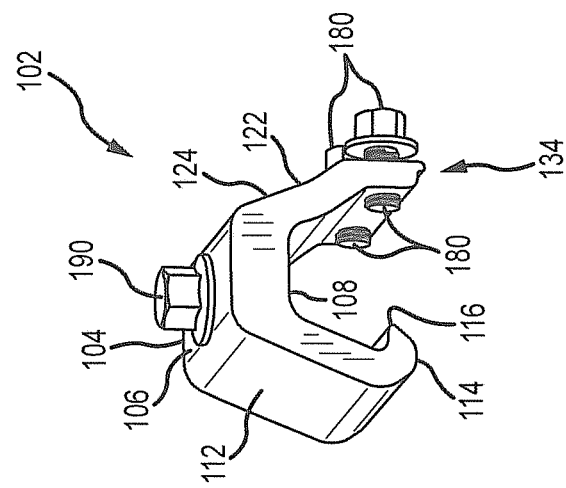
FIG. 7B is a perspective view of the mounting body used by the mounting device in FIG. 2, illustrating a pair of clamping fasteners and attachment fastener each being threadably engaged with the mounting body.
Figure 7A:
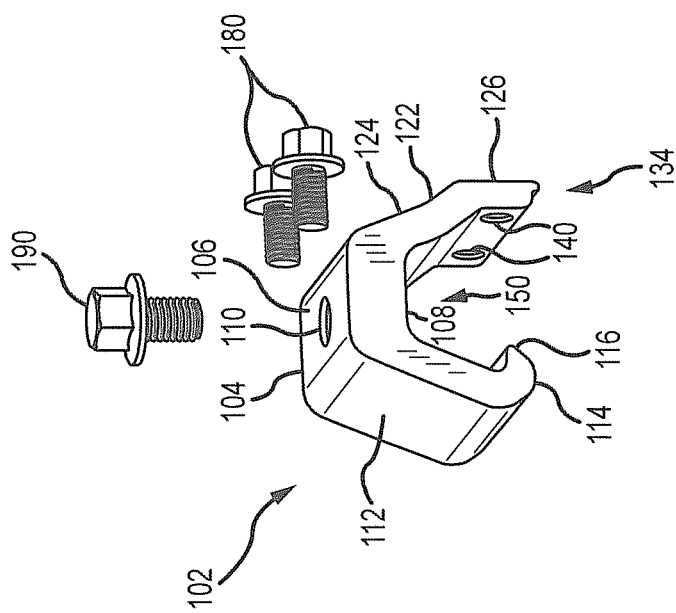
FIG. 7A is a perspective view of the mounting body used by the mounting device in FIG. 2, along with a pair of clamping fasteners and an attachment fastener prior to being engaged with the mounting body.
Figure 8A:
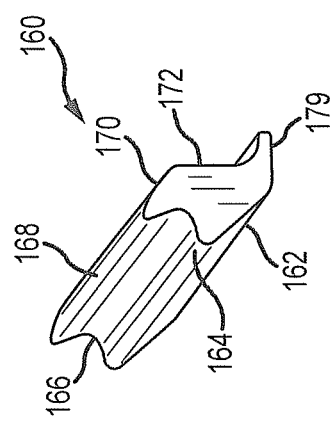
FIG. 8A is a perspective view of the insert used by the mounting device in FIG. 2.
Figure 8C:
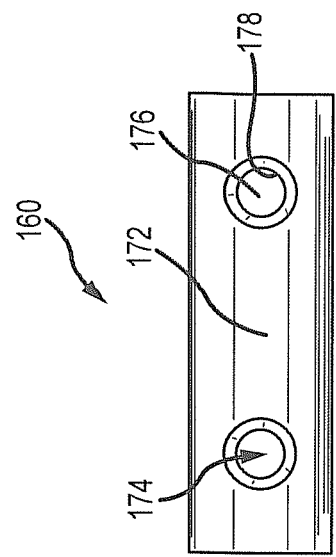
FIG. 8C is a side view of the insert of FIG. 8A.
Figure 8B:
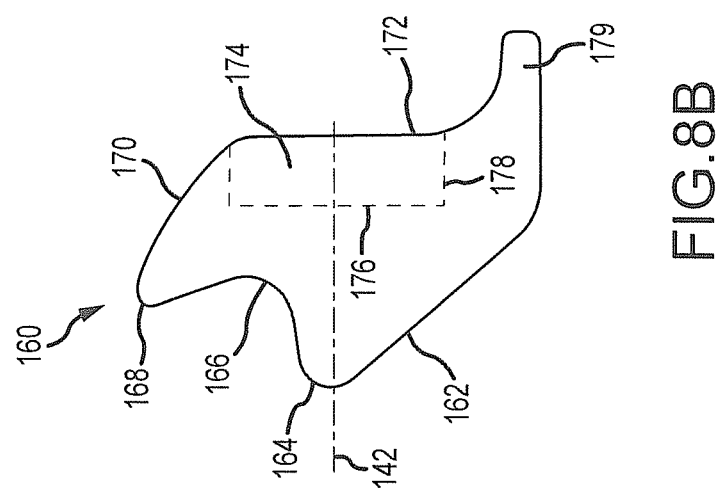
FIG. 8B is an end view of the insert of FIG. 8A.

Additional views for the insert 160 of the mounting device 100 are presented in FIGS. 8A-8C (the insert 160 also being shown in FIGS. 2, 3, and 5). The insert 160 includes a second projection 164 that extends along the entire length of the insert 160 (this length dimension being the left-to-right direction in FIG. 8C). The projection 164 may be defined by an arcuate or curved surface, and defines a pocket 166 on the inside surface of the insert 160. A pad 167 having a higher coefficient of friction than the insert 160 may be positioned along the pocket 166 (e.g., FIGS. 9A and 9B).

The projection 164 for the insert 160 may be characterized as extending at least generally in the direction in which the first leg 112 of the mounting body 102 is spaced from the second leg 122 of the mounting body 102 (or toward the reference plane 152), as extending at least generally in the direction in which the base 104 is spaced from the free end 134 of the second leg 122 (or toward the reference plane 154), or both. The projection 164 may be characterized as "pointing" both at least generally upwardly (or toward the reference plane 154) and toward the reference plane 152 when the mounting device 100 in installed on a rib 54 of the building/roofing surface 50a. In any case, the projection 164 is disposed within the recess 70 on the second sidewall 66 of the rib 54 (and directly below the projection 68 on the second sidewall 66 of the rib 54) when the mounting device 100 in installed on the rib 54 of the building/roofing surface 50a. Contact between the insert 160 and the rib 54 of the building/roofing surface 50a (when the mounting device 100 is completely installed on the rib 54) may be limited to the projection 164/pocket 166 and the recess 70/projection 68 (e.g., the remainder of the insert 160 may be maintained in spaced relation to the rib 54).

The insert 160 includes a number of additional features that facilitate installation of the mounting device 100 (again, discussed below in relation to FIGS. 10A-10F). The insert 160 includes a first or alignment surface 162 (which may extend along the entire length of the insert 160). Prior to rotating or pivoting the mounting body 102 onto the rib 54 (to capture the insert 160 within the rib receptacle 150 of the mounting body 102), the alignment surface 162 of the insert 160 may be positioned against the transition section 72 on the second sidewall 66 of the rib 54 (adjacent to the recess 70).

The noted pocket 166 is located between the second projection 164 of the insert 160 and a third projection 168. This pocket 166 may be characterized as a concave surface on the exterior of the insert 160, and nonetheless provides an interface for the projection 68 on the second sidewall 66 of the rib 54 (e.g., at least part of this projection 68 on the second sidewall 66 of the rib 54 may be captured within this pocket 166). Both the pocket 166 and the third projection 168 may extend along the entire length of the insert 160.

A fastener receptacle surface 172 is on the perimeter or exterior of the insert 160, and is disposed at least generally opposite of the second projection 164. A plurality of clamping fastener receptacles 174 are formed on the fastener receptacle surface 172 (two in the illustrated embodiment) and extend into the interior of the insert 160. There should be one clamping fastener receptacle 174 for each clamping fastener 180 to be used by the mounting device 100. A tapered surface 170 extends from the fastener receptacle surface 172 to the third projection 168. The tapered surface 170 and the alignment surface 162 are disposed in the same general orientation (e.g., having a common sign for their respective slopes, although the magnitude of their respective slopes may differ), but are not parallel to each other in the illustrated embodiment. The tapered surface 170 also may have a slight curvature (e.g., convexly-shaped).

Each clamping fastener receptacle 174 may be characterized as a "blind hole"—no clamping fastener receptacle 174 extends completely through the insert 160. In this regard, each clamping fastener receptacle 174 includes a closed end or base 176 (located within the interior of the insert 160) and an annular sidewall 178 that extends from this base 176 to the fastener receptacle surface 172 of the insert 160. The centerline of each clamping fastener receptacle 174 (e.g., coinciding with the above-noted length dimension 142 for the threaded holes 140 through the second leg 122 of the mounting body 102) may be at least generally aligned with the second projection 164 of the insert 160 (FIG. 8B). In any case, the end of a given clamping fastener 180 will be directed into a corresponding clamping fastener receptacle 174, and will engage its base 176 to move the insert 160 at least generally away from the second leg 122 of the mounting body 102 to clamp the mounting device 100 onto the rib 54. Each clamping fastener receptacle 174 is un-threaded—there is no threadable connection between a giving clamping fastener 180 and its corresponding clamping fastener receptacle 174.

Figure 9B:
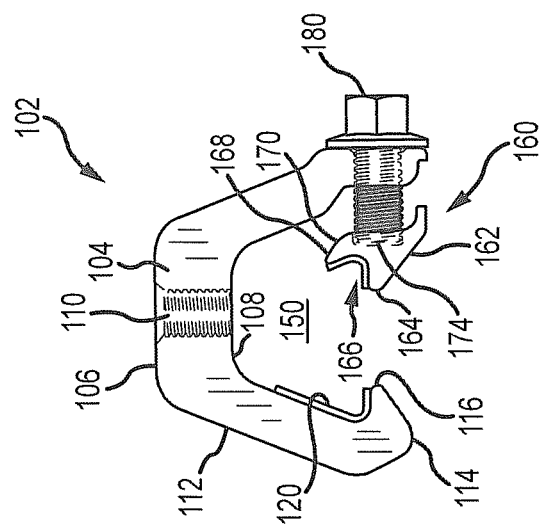
FIG. 9B is an end view of the insert positioned within a variation of the mounting body for the mounting device in FIG. 2, after activation of the clamping fastener(s).
Figure 9A:
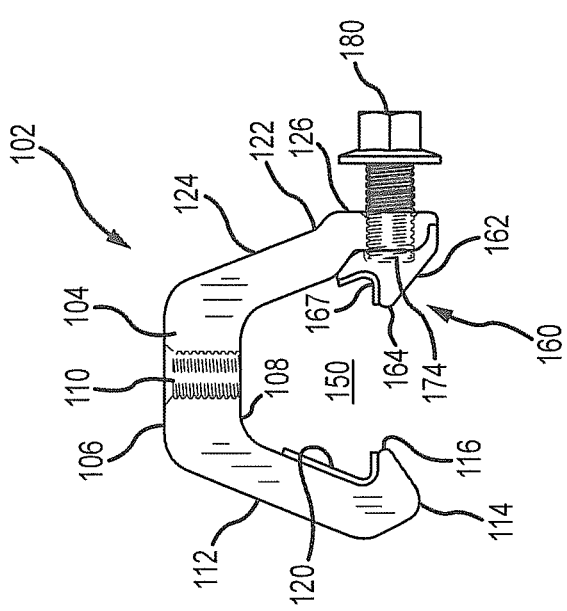
FIG. 9A is an end view of the insert positioned within a variation of the mounting body for the mounting device in FIG. 2, prior to activation of the clamping fastener(s).

FIGS. 9A and 9B illustrate two representative positions for the insert 160 relative to the mounting body 102. FIG. 9A illustrates a representative position of the insert 160 within the insert receptacle 128 of the mounting body 102, along with the disposal of a clamping fastener 180 within a corresponding clamping fastener receptacle 174 of the insert 160. Note that the tapered surface 170 of the insert 160 may be positioned against the upper surface 130 on the interior of the second leg 122 of the mounting body 102, although the tapered surface 170 of the insert 160 could be oriented so as to be spaced from the interior of the second leg 122 at this time (e.g., FIG. 5). Having a gap between the tapered surface 170 of the insert 160 and the interior of the second leg 122 of the mounting body 102 may be advantageous in relation to assembly of the mounting device 100 on a rib 54 (e.g., to accommodate movement of the insert 160 into a position for being secured to the rib 54). In any case, also note that the lip 179 of the insert 160 may also be positioned within the recess 138 on the free end 134 of the second leg 122 of the mounting body 102. Each clamping fastener 180 may be threadably engaged with the second leg 122 of the mounting body 102 (e.g., threaded into a threaded hole 140 of the second leg 122) and may extend into a corresponding clamping fastener receptacle 174 on the insert 160. FIG. 9B illustrates the position of the insert 160 relative to the mounting body 102 when the clamping fasteners 180 are in the fully engaged position (e.g., with the head of the clamping fasteners 180 being positioned against the exterior of the second leg 122). Note that the insert 160 is now spaced from the second leg 122 of the mounting body 102.

Figure 10F:
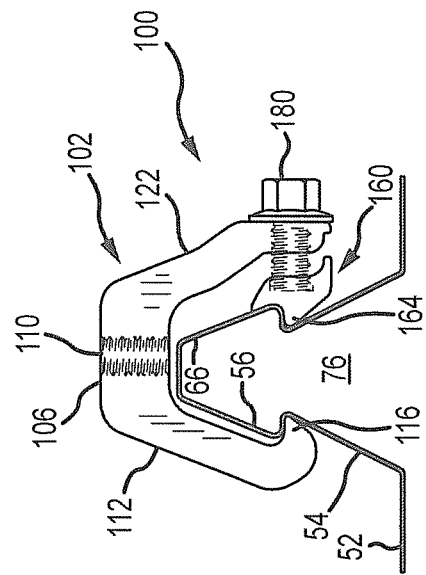

FIGS. 10A-F present a representative sequence for installing the mounting device 100 on a rib 54 for the building/roofing system 50 of FIG. 2. The second projection 164 of the insert 160 may be positioned within the recess 70 on the second sidewall 66 of the rib 54, the projection 68 on the second sidewall 66 of the rib 54 may be positioned within the pocket 166 of the insert 160, and the alignment surface 162 of the insert 160 may be positioned against the transition section 72 of the second sidewall 66 for the rib 54 (FIG. 10A). Moreover, the first projection 116 (on the free end 114 of the first leg 112) of the mounting body 102 may be positioned within the recess 60 on the first sidewall 56 of the rib 54 (e.g., such that part of the first leg 112 of the mounting body 102 is positioned against the first sidewall 56 of the rib 54), the base 104 of the mounting body 102 may be positioned above and in spaced relation to at least part of the upper end 74 of the rib 54, the second leg 122 of the mounting body 102 may be positioned alongside and spaced from the second sidewall 66 of the rib 54, and the rounded portion 136 on the free end 134 of the second leg 122 may be positioned proximate to or in contact with the insert 160 (FIG. 10A). The initial positioning of each of the mounting body 102 and insert 160 relative to the rib 54, shown in FIG. 10A, may be executed in any order.

The mounting body 102 may be rotated or pivoted in a first or clockwise direction (in the end views of FIGS. 10A-10F), from the position illustrated in FIG. 10A to the position illustrated in FIG. 10B. That is, the mounting body 102 may be rotated or pivoted at least generally about its first projection 116, which is again positioned within the recess 60 on the first sidewall 56 of the rib 54. At least at some point in time during this motion of the mounting body 102, part of the second leg 122 of the mounting body 102 (e.g., rounded portion 136 and/or side surface 132) should contact the insert 160 (e.g., tapered surface 170, the boundary between the tapered surface 170 and the fastener receptacle surface 172, and/or the fastener receptacle surface 172). Continued motion of the mounting body 102 in the noted manner should cause a portion of the side surface 132 of the mounting body 102 to contact a portion of the fastener receptacle surface 172 of the insert 160 (FIG. 10B). During this engagement of the interior of the second leg 122 of the mounting body 102 against the insert 160, the insert 160 should be forced against the second sidewall 66 of the rib 54. As shown in FIG. 10B, the alignment surface 162 of the insert 160 may still be positioned against the transition section 72 on the second sidewall 66 of the rib 54 at this time.

With the second leg 122 of the mounting body 102 being engaged with the insert 160, and by continuing to rotate or pivot the mounting body 102 relative to the rib 54 in the first or clockwise direction (in the end views of FIGS. 10A-10F; e.g., at least generally about the first projection 116 on the first leg 112 of the mounting body 102, which is positioned within the recess 60 on the first sidewall 56 of the rib 54), the mounting body 102 may exert an increasing force on the insert 160 to direct the insert 160 against the second sidewall 66 of the rib 54 (FIG. 10C). Moreover, the insert 160 may rotate or pivot at least generally about its second projection 164 (positioned within the recess 70 on the second sidewall 66 of the rib 54) in a second or counterclockwise direction in proceeding from to the FIG. 10B position to the FIG. 10C (e.g., via being contacted by the moving mounting body 102—not shown in FIG. 10C).

The mounting body 102 may be characterized as being "snapped over" the insert 160 going from the FIG. 10B position to the FIG. 10C position. In the FIG. 10C position, the insert 160 may be compressed against the second sidewall 66 of the rib 54 by the mounting body 102, and the insert 160 may be retained against the second sidewall 66 of the rib 54 solely by the mounting body 102 being in the FIG. 10C position. Although the insert 160 could be fully seated within the insert receptacle 128 on the inside of the second leg 122 of the mounting body 102 in the FIG. 10C position (e.g., so that the fastener receptacle surface 172 of the insert 160 is seated against the side surface 132 on the interior of the second leg 122 of the mounting body 102, and so that the lip 179 of the insert 160 is fully seated within the recess 138 on the free end 134 of the second leg 122 of the mounting body 102), such may not be the case in all instances. For instance and as shown in FIG. 10C, there may be at least a slight space between at least part of the fastener receptacle surface 172 of the insert 160 and the side surface 132 on the interior of the second leg 122 of the mounting body 102, the lip 179 of the insert 160 may not be completely disposed within the recess 138 on the free end 134 of the second leg 122 of the mounting body 102, or both.

Figure 10E:
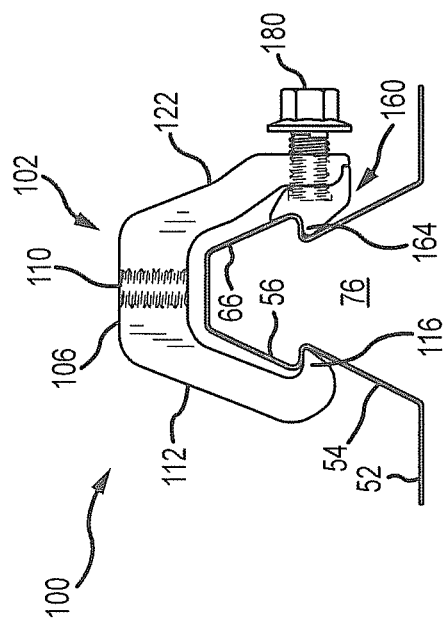

One or more clamping fasteners 180 may be threaded into the second leg 122 of the mounting body 102 (e.g., rotated relative to the second leg 122) and as shown in FIG. 10D (e.g., by threading a clamping fastener 180 into a corresponding hole 140 through the second leg 122). It should be appreciated that it may be necessary to adjust the position of the insert 160 along the length of the rib 54 to align each clamping fastener receptacle 174 on the insert 160 with its corresponding clamping fastener 180. In any case, each clamping fastener 180 may continue to be rotated relative to the second leg 122 to direct each clamping fastener 180 into its corresponding clamping fastener receptacle 174 on the insert 160 (FIG. 10E). This introduction of one or more clamping fasteners 180 into their corresponding clamping fastener receptacle 174 may cause the insert 160 to rotate or pivot at least generally about its second projection 164 (positioned within the recess 70 on the second sidewall 66 of the rib 54), in a second or counterclockwise direction (compare FIG. 10E, where the alignment surface 162 of the insert 160 has moved away from, and is now spaced from the second sidewall 66 of the rib 64, to FIG. 10D). Therefore, the described pivoting or rotation of the insert 160, relative to the rib 54 and about the second projection 164 of the insert 160, may be due to contact between the second leg 112 and the insert 160 during movement of the mounting body 102 relative to the rib 54 in the above-noted manner, may be due to directing one or more clamping fasteners 180 into a corresponding clamping fastener receptacle 174 of the insert 160, or both.

Each clamping fastener 180 may be rotated relative to the second leg 122 so as to engage the base 176 of its corresponding clamping fastener receptacle 174 on the insert 160. Continued rotation of each clamping fastener 180 in this manner will then move the insert 160 away from the second leg 122 of the mounting body 102 (FIG. 10F), which in turn compresses the rib 54 between the first leg 112 of the mounting body 102 (e.g., its first projection 116 engaging the first sidewall 56 of the rib 54 within the recess 60, and its pocket 118 engaging the projection 58 on this first sidewall 56) and the insert 160 (e.g., its second projection 164 engaging the second sidewall 66 of the rib 54 within the recess 70, and its pocket 166 engaging the projection 68 on this second sidewall 66). Compression of the rib 54 by the mounting device 100 may reduce the spacing between the first sidewall 56 of the rib 54 and the second sidewall 66 of the rib 54. However and in one embodiment, the rib 54 is not collapsed by having a mounting device 100 installed thereon in the manner described herein.

In the installation sequence presented up in FIGS. 10A-10F, the mounting body 102 and the insert 160 may move in at least generally opposite directions in going from the FIG. 10A position to the FIG. 10E position. From a common end view, the mounting body 102 moves about one axis in one direction (clockwise at least generally about the first projection 116 of the mounting body 102 positioned within the recess 60 of the rib 54 in the common end view shown in FIGS. 10A-10F), while the insert 160 may move about a different, parallel axis in the opposite direction (counterclockwise at least generally about the second projection 164 of the insert 160 positioned within the recess 70 of the rib 54 in the common end view shown in FIGS. 10A-10F).

Figure 11B:
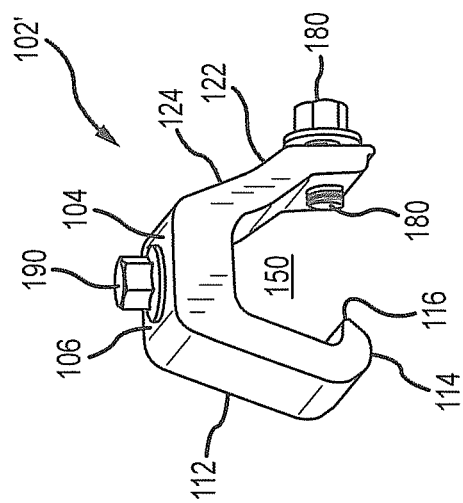
FIG. 11B is a perspective view of the mounting body of FIG. 11A, illustrating the clamping fastener and attachment fastener each being threadably engaged with the mounting body.
Figure 11A:
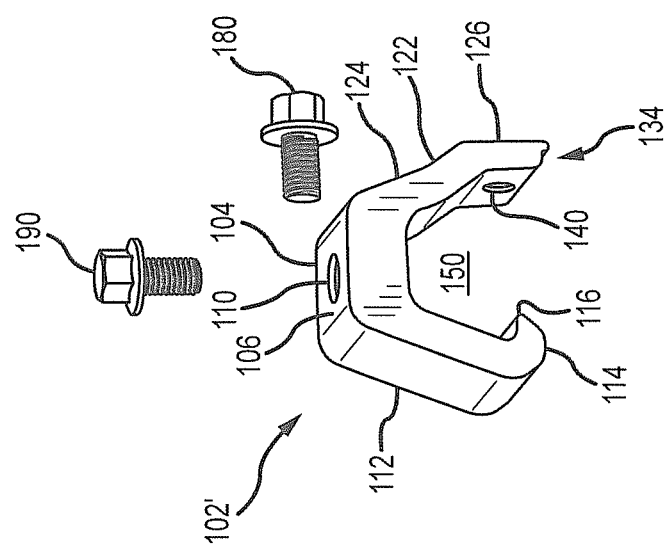
FIG. 11A is a perspective view of a variation of the mounting body used by the mounting device in FIG. 2, along with a single clamping fastener and an attachment fastener prior to being engaged with the mounting body.

A variation of the mounting body for the above-described mounting device 100 is illustrated in FIGS. 11A and 11B and is identified by reference numeral 102'. There are two primary differences between the mounting body 102' (FIGS. 11A and 11B) and the mounting body 102 (FIGS. 2-10F). One is that the mounting body 102' (FIGS. 11A and 11B) is shorter than the mounting body 102 (FIGS. 2-10F). Another is that the mounting body 102' (FIGS. 11A and 11B) uses a single clamping fastener 180 to secure the mounting body 102' relative to the rib 54 (versus the multiple clamping fasteners 180 used by the mounting body 102 (FIGS. 2-10F)).

Figure 12A:
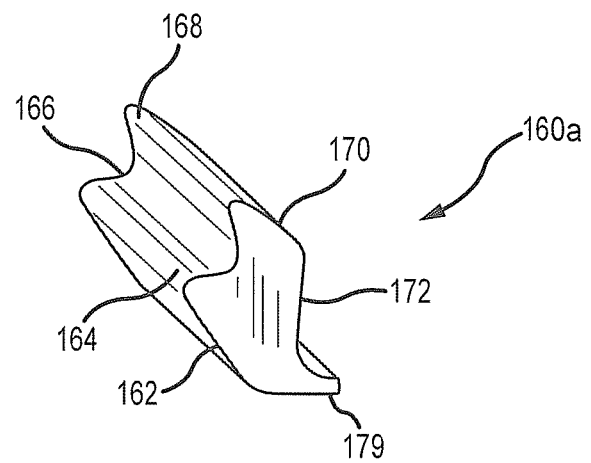
FIG. 12A is a perspective view of an insert that may be used with the mounting body of FIGS. 11A and 11B and for the rib profile illustrated in FIG. 4.
Figure 12B:
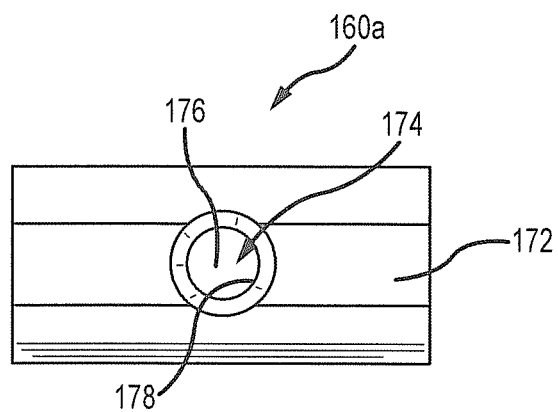
FIG. 12B is a side view of the insert of FIG. 12A.

An insert, for use with the mounting body 102' of FIGS. 11A and 11B and the rib 54 of FIG. 4 (and various other rib profiles), is illustrated in FIGS. 12A and 12B and is identified by reference numeral 160a. There are two primary differences between the insert 160a (FIGS. 12A and 12B) and the insert 160 (FIGS. 2-10F). One is that the insert 160a (FIGS. 12A and 12B) is shorter than the insert 160 (FIGS. 2-10F). Another is that the insert 160a (FIGS. 12A and 12B) incorporates a single clamping fastener receptacle 174 (to receive an end portion of a corresponding clamping fastener 180, to in turn secure the mounting body 102' and insert 160a relative to the rib 54), whereas the insert 160 (FIGS. 2-10F) incorporates multiple clamping fastener receptacles 174 that are spaced along the length of the insert 160.

Figure 13:
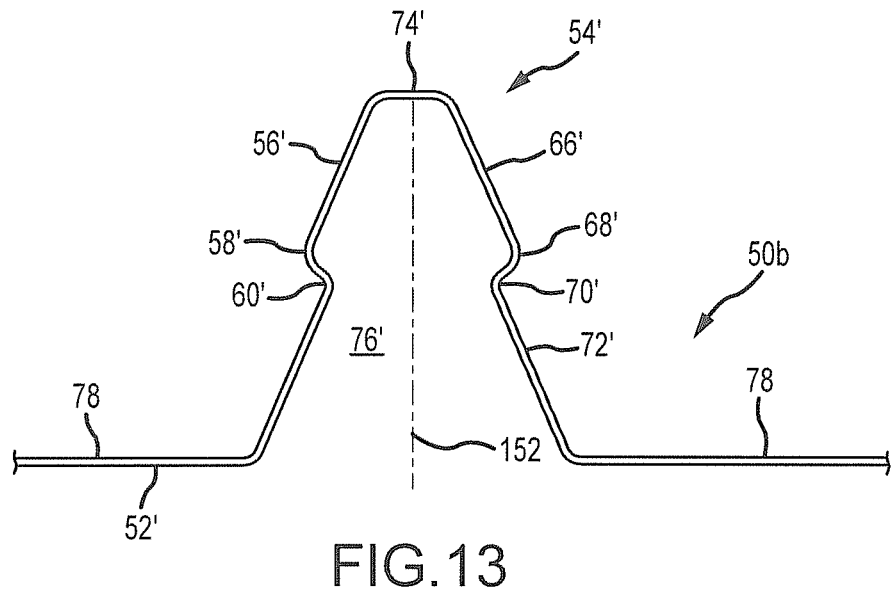
FIG. 13 is an enlarged end view of another rib profile for a panel that may be used by a building/roofing surface.

There are various hollow rib profiles for metal panels. As noted, the mounting device 100 may be installed on a variety of hollow rib profiles and including the rib 54 of FIG. 5. Another representative rib profile is illustrated in FIG. 13. FIG. 13 presents an enlarged end view of a rib 54' incorporated by a panel 52' that may be used by a building/roofing surface 50b. The rib 54' may be formed in the panel 52' in any appropriate manner. The panel 52' may be of any appropriate configuration and may be formed from any appropriate material or combination of materials (e.g., metal; metal alloy). Each panel 52' may include one or more ribs 54' and one or more base sections 78. Moreover and as noted above, adjacent panels 52' may be interconnected to define a rib 54' as well. The entirety of each base section 78 may be flat or planar. However, one or more small structures may be formed/shaped into one of more base sections 78 of a given panel 52', for instance one or more crests, minor ribs, intermediate ribs, pencil ribs, striations, fluting, flutes, or the like.

The rib 54' includes a first sidewall 56', a second sidewall 66', and an upper end or crown 74' that collectively define a hollow interior 76' for the rib 54'. The hollow interior 76' may be in the form of a continuous open space. In one embodiment, the adjacentmost portions of the first sidewall 56' and second sidewall 66' (measured on the interior of the hollow rib 54') are separated by an open space of at least about ½ inch. Generally, the first sidewall 56' and the second sidewall 66' are spaced from each other, and at least generally converge toward one another progressing from the adjacent base section 78 of the panel 52' to the upper end 74' of the rib 54' (the first and second sidewalls 56', 66' diverge relative to one another proceeding away from the upper end 74'). The first sidewall 56' and the second sidewall 66' may be the mirror image of one another. In the illustrated embodiment, the upper end 74' of the rib 54' is a flat surface that is parallel to the pitch of the roofing surface 50b or to a plane that defines the inclination of the roofing surface 50b.

The first sidewall 56' of the rib 54' may be characterized as including a projection 58'. A recess 60' (e.g., a curved or arcuate surface that extends along the length of the rib 54') is disposed directly below the projection 58'. Similarly, the second sidewall 66' of the rib 54' may be characterized as including a projection 68'. A recess 70' (e.g., a curved or arcuate surface that extends along the length of the rib 54') is disposed directly below the projection 68'. In one embodiment, the distance between the recesses 60', 70' is at least about ½ inch (measured within the interior 76'). In any case, a transition section 72' of the second sidewall 66' extends from the recess 70' at least toward the corresponding base section 78 of the panel 52'. In the illustrated embodiment, the transition section 72' is a flat surface that extends all the way from the recess 70' to the corresponding base section 78.

The above-described mounting body 102 (FIGS. 2-10F) may also be used in conjunction with the rib 54' shown in FIG. 13. However, it may be desirable to use a different insert. FIG. 14 and FIGS. 15A-15C illustrates an insert 160' that is appropriate for use with the mounting body 102 for attachment to the rib 54' (and various other rib profiles). Corresponding portions of the insert 160 (FIGS. 2-10F) and the insert 160' (FIG. 14 and FIGS. 15A-15C) are identified by the same reference numeral. Those portions of the insert 160' that differ from the corresponding portion of the insert 160 are further identified by a "single prime" designation. The alignment surface 162', second projection 164', pocket 166', third projection 168', and tapered surface 170' are all at least generally in accordance with the discussion of the corresponding portions of the insert 160, but may be of a different orientation, may be of a different size, or the like. For instance, the alignment surface 162' of the insert 160' may be oriented at a steeper slope than the alignment surface 162 of the insert 160. The tapered surface 170' of the insert 160' may be flat, whereas the tapered surface 170 of the insert 160 has a slight curvature as noted above (e.g., slightly convex). Finally, the spacing between the second projection 164' and the fastener receptacle surface 172 of the insert 160' is greater than the spacing between the second projection 164 and the fastener receptacle surface 172 of the insert 160 (measured along the length dimension 142 of the threaded holes 140, and along which the clamping fastener(s) 180 move).

Figure 16C:
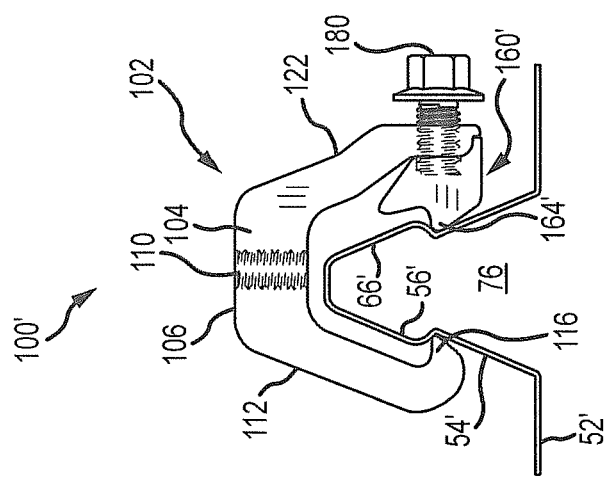

FIGS. 16A-16D present a representative sequence for installing a mounting device 100' (the mounting body 102 and insert 160') on a rib 54' of the building/roofing surface 50b. It should be noted that the pad 120 may be used by the first leg 112 of the mounting body 102, and that the pad 167 may be used in the pocket 166' of the insert 160' (not shown). The second projection 164' of the insert 160' may be positioned within the recess 70' on the second sidewall 66' of the rib 54', the projection 68' on the second sidewall 66' of the rib 54' may be positioned within the pocket 166' of the insert 160', and the alignment surface 162' of the insert 160' may be positioned against the transition section 72' of the second sidewall 66' for the rib 54' (FIG. 16A). Moreover, the first projection 116 (on the free end 114 of the first leg 112) of the mounting body 102 may be positioned within the recess 60' on the first sidewall 56' of the rib 54' (e.g., such that part of the first leg 112 of the mounting body 102 is positioned against the first sidewall 56' of the rib 54'), the base 104 of the mounting body 102 may be positioned above and in spaced relation to at least part of the upper end 74' of the rib 54', the second leg 122 of the mounting body 102 may be positioned alongside and spaced from the second sidewall 66' of the rib 54', and the rounded portion 136 and the free end 134 of the second leg 122 may be positioned proximate to or in contact with the insert 160' (FIG. 16A). The initial positioning of each of the mounting body 102 and insert 160' (relative to the rib 54'), shown in FIG. 16A, may be executed in any order.

The mounting body 102 may be rotated or pivoted in a first or clockwise direction (in the end views of FIGS. 16A-16D), from the position illustrated in FIG. 16A to the position illustrated in FIG. 16B, and then to the position illustrated in FIG. 16C. That is, the mounting body 102 may be rotated or pivoted at least generally about its first projection 116, which is again positioned within the recess 60' on the first sidewall 56' of the rib 54'. At least at some point in time during this motion of the mounting body 102, the second leg 122 of the mounting body 102 (e.g., rounded portion 136 and/or side surface 132) should contact the insert 160' (e.g., tapered surface 170', the boundary between the tapered surface 170' and the fastener receptacle surface 172, and/or the fastener receptacle surface 172). Continued motion of the mounting body 102 in the noted manner should cause a portion of the side surface 132 of the mounting body 102 to contact a portion of the fastener receptacle surface 172 of the insert 160' (FIG. 16B). The insert 160' may be forced against the second sidewall 66' of the rib 54' as a result of being engaged by the interior of the second leg 122 of the mounting body 102. Moreover, continued motion of the mounting body 102 in the noted manner may rotate or pivot the insert 160' at least generally about its second projection 164' (positioned within the recess 70' on the second sidewall 66' of the rib 54') in a second or counterclockwise direction (in the end views of FIGS. 16A-16D) in proceeding from the FIG. 16A position to the FIG. 16B and 16C positions. Note that the alignment surface 162' of the insert 160' has moved away from the transition section 72' of the second sidewall 66' for the rib 54' in each of the FIG. 16B and 16C positions compared to the FIG. 16A position.

A number of observations may be made about the portion of the installation sequence presented up to FIG. 16C. One is that the mounting body 102 and the insert 160' may move in at least generally opposite directions to realize the position illustrated in FIG. 16C (from the position of FIG. 16A). From a common end view, the mounting body 102 moves about one axis in one direction (clockwise at least generally about the first projection 116 of the mounting body 102 positioned within the recess 60' of the rib 54' in the common views shown in FIGS. 16A-16D), while the insert 160' may move about a different, parallel axis in the opposite direction (counterclockwise at least generally about the second projection 164' of the insert 160' positioned within the recess 70' of the rib 54' in the common views shown in FIGS. 16A-16D).

The mounting body 102 may be characterized as being "snapped over" the insert 160' going from the FIG. 16B position to the FIG. 16C position. In the FIG. 16C position, the insert 160' may be compressed against the second sidewall 66' of the rib 54' by the mounting body 102, and the insert 160' may be retained against the second sidewall 66' of the rib 54' solely by the mounting body 102 being in the FIG. 16C position. Although the insert 160' is illustrated as being fully seated within the insert receptacle 128 on the inside of the second leg 122 of the mounting body 102 in the FIG. 16C position (e.g., so that the fastener receptacle surface 172 of the insert 160' is seated against the side surface 132 on the interior of the second leg 122 of the mounting body 102, and so that the lip 179 of the insert 160' is fully seated within the recess 138 on the free end 134 of the second leg 122 of the mounting body 102), such may not be the case in all instances. For instance, there could be at least a slight space between at least part of the fastener receptacle surface 172 of the insert 160' and the side surface 132 on the interior of the second leg 122 of the mounting body 102, the lip 179 of the insert 160' may not be completely disposed within the recess 138 on the free end 134 of the second leg 122 of the mounting body 102, or both.

Figure 16D:
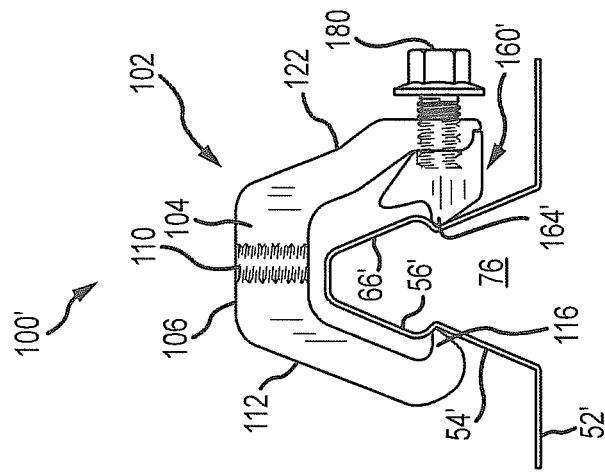

One or more clamping fasteners 180 may be threaded into the second leg 122 of the mounting body 102 (e.g., rotated relative to the second leg 122) and as shown in FIG. 16C (e.g., by threading a clamping fastener 180 into a corresponding hole 140 through the second leg 122). It should be appreciated that it may be necessary to adjust the position of the insert 160' along the length of the rib 54' to align each clamping fastener receptacle 174 on the insert 160' with its corresponding clamping fastener 180. In any case, each clamping fastener 180 may continue to be rotated relative to the second leg 122 to direct each clamping fastener 180 into its corresponding clamping fastener receptacle 174 on the insert 160' (FIG. 16D). The described pivoting or rotation of the insert 160', relative to the rib 54' and about the second projection 164' of the insert 160', may be due to contact between the second leg 112 and the insert 160' during movement of the mounting body 102 relative to the rib 54 in the above-noted manner, may be due to directing one or more clamping fasteners 180 into a corresponding clamping fastener receptacle 174 of the insert 160', or both.

Each clamping fastener 180 may be rotated relative to the second leg 122 to engage the base 176 of its corresponding clamping fastener receptacle 174 on the insert 160'. Continued rotation of each clamping fastener 180 in this manner will then move the insert 160' away from the second leg 122 of the mounting body 102, which in turn may compress the rib 54' between the first leg 112 of the mounting body 102 (e.g., its first projection 116 engaging the first sidewall 56' of the rib 54' within the recess 60', and its pocket 118 engaging the projection 58' on this first sidewall 56') and the insert 160' (e.g., its second projection 164' engaging the second sidewall 66' of the rib 54' within the recess 70', and its pocket 166' engaging the projection 68' on this second sidewall 66'). This compression of the rib 54' may reduce the spacing between the first sidewall 56' of the rib 54' and the second sidewall 66' of the rib 54'. However and in one embodiment, the rib 54' is not collapsed by having the mounting body 102 and insert 160' installed thereon in the manner described herein.

Figure 14:
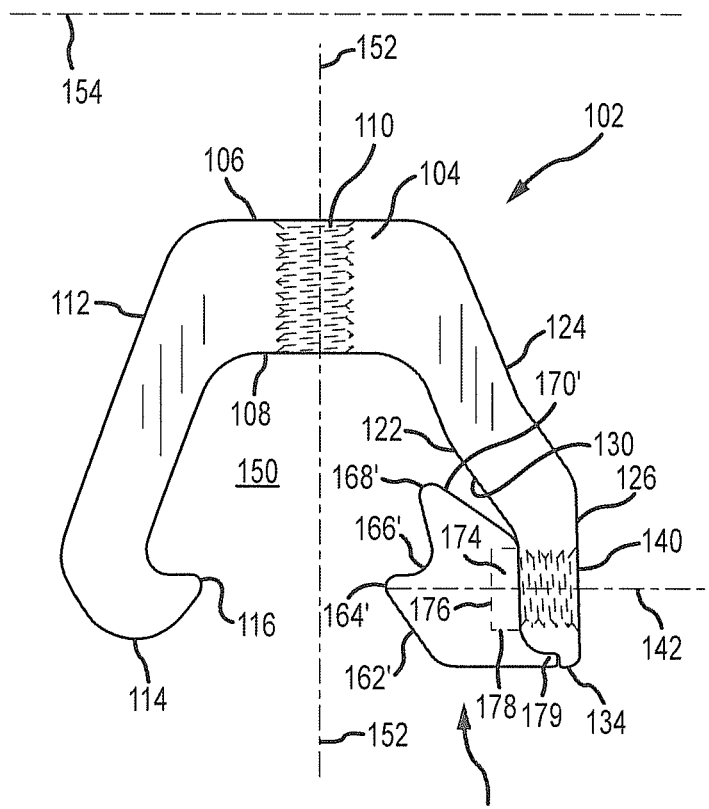
FIG. 14 is an enlarged end view of another embodiment of a mounting device for installation on the rib profile of FIG. 13, where this mounting device uses the mounting body from FIG. 2 and another embodiment of an insert.
Figure 17A:
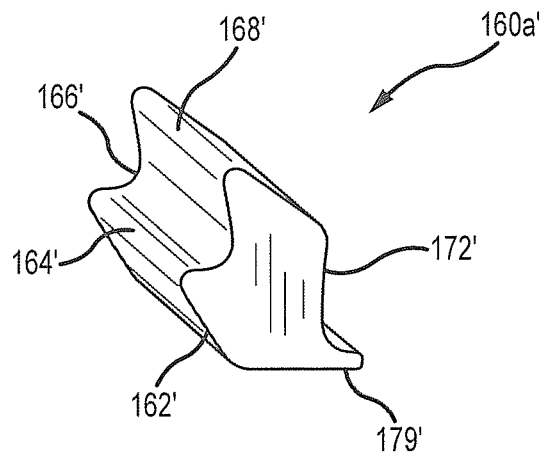
FIG. 17A is a perspective view of a variation of the insert of FIGS. 15A-15C, but for use with the mounting body of FIGS. 11A and 11B.
Figure 17B:
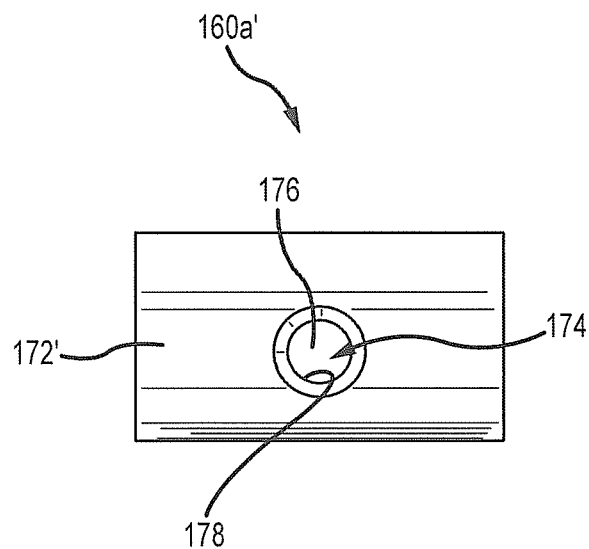
FIG. 17B is a side view of the insert of FIG. 17A.

An insert, for use with the mounting body 102' of FIGS. 11A and 11B and the rib 54' of FIG. 13 (and various other rib profiles) is illustrated in FIGS. 17A and 17B and is identified by reference numeral 160a'. There are two primary differences between the insert 160a' (FIGS. 17A and 17B) and the insert 160' (FIGS. 14 and 15A-15C). One is that the insert 160a' (FIGS. 17A and 17B) is shorter than the insert 160' (FIGS. 14 and 15A-5C). Another is that the insert 160a' (FIGS. 17A and 17B) incorporates a single clamping fastener receptacle 174 (to receive an end portion of a corresponding clamping fastener 180, to in turn secure the mounting body 102' and insert 160a relative to the rib 54), whereas the insert 160' (FIGS. 14 and 15A-15C) incorporates multiple clamping fastener receptacles 174 that are spaced along the length of the insert 160'.

An attachment 200 may be secured to the mounting body 102 using one or more attachment fasteners that are directed through the attachment 200 and that threadably engage the mounting body 102 (e.g., by being directed into a corresponding threaded hole 110 that is accessible on the upper section 106 of the base 104 of the mounting body 102).

Figure 18:
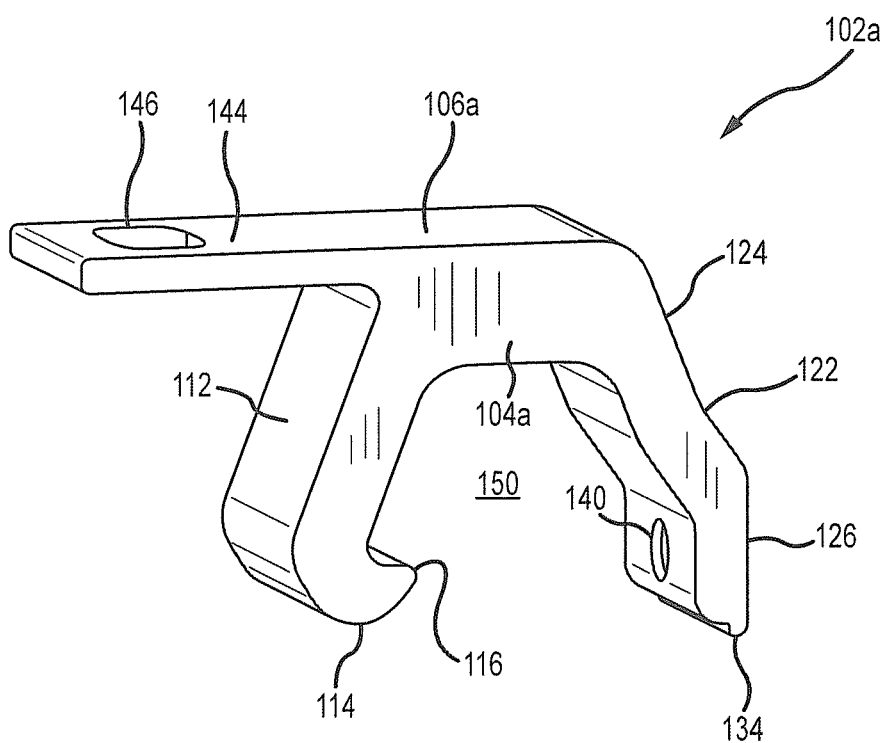
FIG. 18 is a perspective view of a variation of a mounting body for the mounting device from the building/roofing system of FIG. 2.

Another option is illustrated in FIG. 18, and is a variation of the mounting body 102' of FIGS. 11A and 11B (although the mounting flange 144 to be described could also be used by the mounting body 102 as well). The mounting body 102a of the FIG. 18 embodiment includes a mounting flange 144 that extends from the base 104a. In the illustrated embodiment, the upper surface of the mounting flange 144 and the upper section 106a of the base 104a are each flat and are contained within a common plane. However, the mounting flange 144 could be offset from the upper section 106a (including being disposed in parallel relation). In any case, the mounting flange 144 includes at least one mounting hole 146. Each mounting hole 146 may be of any appropriate shape (e.g., circular, an elongated slot). Moreover, each mounting hole 146 may be un-threaded or threaded.

An attachment 200 may be positioned at least on the mounting flange 144 (the attachment could also be positioned on the upper section 106a of the base 104a). A threaded attachment fastener (e.g., a bolt) may be directed through the attachment 200 and then through the mounting flange 144. A nut could then be threaded onto the free end of the attachment fastener to secure the attachment 200 to the mounting body 102a. If the mounting hole 146 on the mounting flange 144 is threaded, it could extend all the way through the mounting flange 144 or it could extend only part way through the thickness of the mounting flange 144.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A mounting device attachable to a rib of a building surface, comprising:
  a mounting body comprising a base, a first leg that extends from said base, a second leg that extends from said base and that is spaced from said first leg, and a rib receptacle collectively defined by said base, said first leg, and said second leg, wherein a first reference plane is positioned above said mounting device when said mounting device is disposed in an upright orientation, wherein a second reference plane is perpendicular to said first reference plane and extends through said rib receptacle in an orientation that includes a height and length dimension of said rib receptacle, wherein said first leg extends from said base in a direction that is away from each of said first reference plane and said second reference plane, wherein said first leg comprises a first projection that extends back in a direction of said second reference plane, wherein said second leg comprises a first section that extends from said base and in a direction that is away from each of said first reference plane and said second reference plane, wherein said second leg further comprises a second section that extends from said first section in a direction that is away from said first reference plane and with said second section being disposed in a different orientation than said first section, and wherein said first leg, said base, and said second leg are retained in a fixed position relative to one another;

at least one clamping fastener that is threadably engaged with and extends through said second section of said second leg of said mounting body; and an insert disposed within said rib receptacle and aligned with said at least one clamping fastener, wherein said insert comprises:
- a clamping fastener surface that projects toward said second section of said second leg of said mounting body;
- a second projection that extends in a direction of said second reference plane and that is at least generally oppositely disposed from said clamping fastener surface;
- a rib alignment surface that extends both toward said first reference plane and toward said second reference plane in proceeding to said second projection;
- a third projection that is spaced from said first projection in a direction of said first reference plane and that extends in a direction of said second reference plane;
- a concave pocket located between said second projection and said third projection; and
- an upper surface that extends both toward said first reference plane and said second reference plane in proceeding from said clamping fastener surface to said third projection.

2. The mounting device of claim 1, wherein said mounting body is of a one-piece construction.

3. The mounting device of claim 1, wherein said base comprises an upper surface on an opposite side of said base in relation to said rib receptacle, and wherein a threaded attachment fastener hole intersects with said upper surface of said base and extends in a direction of said rib receptacle.

4. The mounting device of claim 1, wherein said mounting body further comprises a mounting flange that extends from said base, wherein said mounting flange comprises an un-threaded hole that extends completely through said mounting flange.

5. The mounting device of claim 1, wherein said first projection also extends at least generally toward said first reference plane.

6. The mounting device of claim 1, wherein said first section of said second leg of said mounting body is located between said second section of said second leg of said mounting body and said base of said mounting body.

7. The mounting device of claim 1, wherein said second section of said second leg for said mounting body is oriented at least substantially parallel with said second reference plane.

8. The mounting device of claim 1, wherein said second section of said second leg comprises at least one threaded clamping fastener hole that extends completely through said second leg, and wherein a length dimension of each said threaded clamping fastener hole is oriented at least substantially orthogonal to said second reference plane.

9. The mounting device of claim 1, wherein said clamping fastener surface comprises at least one clamping fastener receptacle that projects toward said second section of said second leg of said mounting body.

10. The mounting device of claim 9, wherein said insert comprises a plurality of clamping fastener receptacles that are spaced along a length dimension of said insert.

11. The mounting device of claim 9, wherein each said clamping fastener receptacle is un-threaded.

12. The mounting device of claim 9, wherein each said clamping fastener receptacle comprises a closed end, an open end, and an annular sidewall extending between said closed end and said open end, and wherein said open end is located between said closed end and said second section of said second leg of said mounting body.

13. The mounting device of claim 1, wherein said clamping fastener surface is flat.

14. The mounting device of claim 1, wherein said second projection of said insert also extends toward said first reference plane.

15. The mounting device of claim 1, wherein a spacing between second projection and said second reference plane is less than a spacing between said third projection and said second reference plane.

16. The mounting device of claim 1, wherein said upper surface of said insert projects toward said first section of said second leg of said mounting body.

17. The mounting device of claim 16, wherein said upper surface of said insert is convex.

18. The mounting device of claim 1, wherein a spacing between said second leg of said mounting body and said upper surface of said insert progressively increases in proceeding along said upper surface in a direction of said third projection.

19. The mounting device of claim 1, wherein said rib alignment surface of said insert and said upper surface of said insert are at least generally oppositely disposed.

20. The mounting device of claim 1, wherein a slope of said upper surface of said insert in proceeding in a direction of said third projection of said insert is of a common sign with a slope of said rib alignment surface of said insert in proceeding in a direction of said second projection of said insert.

* * * * *